(12) United States Patent
Cao et al.

(10) Patent No.: US 11,755,916 B2
(45) Date of Patent: Sep. 12, 2023

(54) SYSTEM AND METHOD FOR IMPROVING DEEP NEURAL NETWORK PERFORMANCE

(71) Applicant: ROYAL BANK OF CANADA, Montreal (CA)

(72) Inventors: Yanshuai Cao, Toronto (CA); Ruitong Huang, Toronto (CA); Junfeng Wen, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 907 days.

(21) Appl. No.: 16/562,067

(22) Filed: Sep. 5, 2019

(65) Prior Publication Data

US 2020/0074305 A1    Mar. 5, 2020

Related U.S. Application Data

(60) Provisional application No. 62/727,504, filed on Sep. 5, 2018.

(51) Int. Cl.
| | |
|---|---|
| *G06N 3/08* | (2006.01) |
| *G06N 3/084* | (2023.01) |
| *G06V 10/82* | (2022.01) |
| *G06F 18/24* | (2023.01) |
| *G06N 3/047* | (2023.01) |
| *G06N 7/01* | (2023.01) |
| *G06V 10/764* | (2022.01) |
| *G06V 10/778* | (2022.01) |

(52) U.S. Cl.
CPC ............. *G06N 3/084* (2013.01); *G06F 18/24* (2023.01); *G06N 3/047* (2023.01); *G06N 3/08* (2013.01); *G06N 7/01* (2023.01); *G06V 10/764* (2022.01); *G06V 10/7788* (2022.01); *G06V 10/82* (2022.01)

(58) Field of Classification Search
CPC ........ G06N 3/08; G06N 3/0472; G06N 7/005; G06V 10/82; G06K 9/6267
See application file for complete search history.

(56) References Cited

U.S. PATENT DOCUMENTS

2019/0026655 A1*    1/2019    Xie ........................ G16H 10/60

OTHER PUBLICATIONS

Rebuffi et al., "iCaRL: Incremental Classifier and Representation Learning", Apr. 14, 2017, arXiv:1611.07725v2, pp. 1-15. (Year: 2017).*

Aljundi, R .; Chakravarty, P .; and Tuytelaars, T., Expert gate: Lifelong learning with a network of experts, In CVPR, 7120-7129, arXiv:1611.06194v2 [cs.CV], Apr. 19, 2017.

(Continued)

*Primary Examiner* — Ying Yu Chen
(74) *Attorney, Agent, or Firm* — Norton Rose Fulbright Canada LLP

(57) ABSTRACT

An improved computer implemented method and corresponding systems and computer readable media for improving performance of a deep neural network are provided to mitigate effects related to catastrophic forgetting in neural network learning. In an embodiment, the method includes storing, in memory, logits of a set of samples from a previous set of tasks ($D_1$); and maintaining classification information from the previous set of tasks by utilizing the logits for matching during training on a new set of tasks ($D_2$).

20 Claims, 16 Drawing Sheets

(56) References Cited

OTHER PUBLICATIONS

Ba, J., and Caruana, R., Do deep nets really need to be deep?, In Advances in neural information processing systems, 2654-2662, https://papers.nips.cc/paper_files/paper/2014/file/ea8fcd92d59581717e06eb187f10666d-Paper. odf, 2014.

Bucila, C .; Caruana, R .; and Niculescu-Mizil, A., Model compression, In Proceedings of the 12th Acm Sigkdd International conference on Knowledge discovery and data mining, 535-541. ACM, Aug. 20-23, 2006.

Cao, Y .; Ding, G.W .; Lui, K. Y. C .; and Huang, R., Improving GAN training via binarized representation entropy (BRE) regularization, International Conference on Learning Representations, arXiv:1805.03644v1 [cs.LG], May 9, 2018.

Caruana, R., Multitask Learning, Machine Learning 28(1):41-75, Sep. 23, 1997.

French, R. M., Catastrophic forgetting in connectionist networks: Causes, Consequences and Solutions, Trends in cognitive sciences 3(4):128-135, 1999.

Hinton, G .; Vinyals, O .; and Dean, J., Distilling the knowledge in a neural network, arXiv preprint arXiv:1503.02531, Mar. 9, 2015.

Kirkpatrick, J .; Pascanu, R .; Rabinowitz, N .; Veness, J .; Desjardins, G .; Rusu, A. A .; Milan, K .; Quan, J .; Ramalho, T .; Grabska-Barwinska, A .; et al., Overcoming catastrophic forgetting in neural networks, Proceedings of the National Academy of Sciences 114(13):3521-3526, arXiv: 1612.00796v2 [cs.LG], Jan. 25, 2017.

Li, Z., and Hoiem, D., Learning without forgetting, IEEE Transactions on Pattern Analysis and Machine Intelligence, arXiv: 1606.09282v3 [cs.CV], Feb. 14, 2017.

Lopez-Paz, D., et al., Gradient episodic memory for continual learning, In Advances in Neural Information Processing Systems, 6467-6476, 31st Conference on Neural Information Processing Systems (NIPS 2017), Long Beach, Ca, USA, 2017.

McClelland, J. L .; McNaughton, B. L .; and O'reilly, R. C., Why there are complementary learning systems in the hippocampus and neocortex: insights from the successes and failures of connectionist models of learning and memory Psychological review 102(3):419, 1995.

McCloskey, M., and Cohen, N. J., Catastrophic interference in connectionist networks: The sequential learning problem, In Psychology of learning and motivation, vol. 24. Elsevier. 109-165, 1989.

Rannen Ep Triki, A .; Aljundi, R .; Blaschko, M .; and Tuytelaars, T., Encoder based lifelong learning, In Proceedings CCV 2017, 1320-1328, arXiv:1704.01920v1 [cs.CV], Apr. 6, 2017.

Zenke, F.; Poole, B .; and Ganguli, S., Continual learning through synaptic intelligence, arXiv:1703.04200v3 [cs.LG], Jun. 12, 2017.

\* cited by examiner

SYSTEM AND METHOD FOR IMPROVING DEEP NEURAL NETWORK PERFORMANCE

CROSS REFERENCE

This application is a non-provisional of, and claims all benefit, including priority to, U.S. Application No. 62/727,504, entitled "SYSTEM AND METHOD FOR IMPROVING DEEP NEURAL NETWORK PERFORMANCE", filed on 2018 Sep. 5, incorporated herein by reference in its entirety.

FIELD

Embodiments of the present disclosure generally relate to the field of neural networking, and more specifically, embodiments relate to devices, systems and methods for training deep neural network performance by overcoming catastrophic forgetting by sparse self-distillation.

INTRODUCTION

Neural networks are a useful tool for computationally approaching complex problems, especially practical problems with a large number of variables and factors where causation and correlation are uncertain. However, neural networks, after being tuned to solve a specific problem, become less effective at solving earlier problems. The impact of this deficiency resultant from this technological problem is addressed in various embodiments described herein.

SUMMARY

Deep neural networks have shown their efficacy in solving challenging problems in practice (e.g., in relation to image recognition). However, when a well-trained model is adapted to a new task by fine-tuning its parameters, more often than not the newly acquired knowledge will overwrite what has been learned from the previous tasks, which is known as catastrophic forgetting. In order not to forget previous knowledge, it is necessary to maintain certain information from previous tasks.

Two different types of tasks can include, as an illustrative, non-limiting example, two different types of image recognition tasks. The deep neural network is trained on a first task, and a challenge with prior deep neural networks is that after training on the second task, the neural network exhibits poor performance on the first task. The tasks may be connected to each other, for example, training on a permuted data set (e.g., a linear transformation of a first image, such as a color space shift from), or a transformed data set (e.g., a non-linear transform of the first image). As a specific example, a first task may be a classification of handwriting images based on original image data. A second task, can include conducting a same classification against a non-linear transformation of the image data.

The approaches described herein, in some embodiments, focus on classification problems and show that, using logits—the model prediction before the softmax transformation—is surprisingly effective in overcoming a technical problem in catastrophic forgetting. The computational approach is an improved mechanism in relation to neural network computing, targeted at solving technical problems in relation to catastrophic forgetting while limiting memory usage of finite memory resources. Accordingly, Applicant has termed the claimed embodiments "few shot reminding for overcoming catastrophic forgetting by sparse self-distillation".

The approach has been validated in experimental data sets in relation to practical, real-world classification tasks (e.g., image classification and handwriting analysis). "Few shot" in this disclosure refers to the constrained memory storage of memorizing only a few prior logits (e.g., storing training aspects from only a few images are sufficient to "remind" the deep neural network about previous tasks). In the experimental data, results were established at different memory/size task ratios, which is an important consideration in practical implementations of neural networks where there are only finite computational resources available.

Applicant notes that the implementations are not thus limited to only these tasks and that the improved neural network computing system can be utilized in a variety of other classification tasks or improving other neural network training model data architectures that are vulnerable to catastrophic forgetting.

By utilizing a memory of previous data, together with their logits from previous models, the method of some embodiments can maintain previous tasks' performance while learning a new task. Experiments on the MNIST and CIFAR10 datasets show that, compared to other approaches such as storing predicted labels or model parameters, using logits is more effective in maintaining classification accuracy on previous tasks and it is also more space efficient: even a very small memory suffices good overall classification performance.

Deep neural networks are known to suffer the catastrophic forgetting problem, that they tend to forget the knowledge from the previous tasks when they are trained on the new tasks in a sequential fashion. Thus, the performances of a neural network on the old tasks can drop tremendously when it is further fine-tuned/trained on a new task.

In this work, Applicants show that it is possible to learn new tasks without significantly sacrificing the previous performances. The method of some embodiments memorizes the logits (e.g., of some random samples from the old tasks), and maintains the classification information from previous tasks by matching these logits during the training on the new task. This maintained classification information acts as a set of "anchor points" that help ensure stability of the learning aspects of the neural network as it trains on different data sets. The anchor points help establish stability in view of subsequent stochastic optimization for other objectives.

An example output is the deep neural network or representations thereof (e.g., a data structure encapsulating the trained deep neural network) after it has been trained on the new task when training includes matching logits from the old task during the training on the new task. Another potential output of the system is the constrained memory data storage storing the subset of logits from the first task. A further potential output of the system is a data structure storing the classifications generated in respect of the first task by the deep neural network after training on the second task subsequent to the original training on the first task.

In a first aspect, there is provided a computer implemented method for improving performance of a deep neural network, the method comprising: storing, in memory, logits of a set of samples from a previous set of tasks ($D_1$); and maintaining classification information from the previous set of tasks by utilizing the logits for matching during training on a new set of tasks ($D_2$).

In particular, the performance is improved by avoiding or mitigating the impacts of catastrophic forgetting by using a constrained memory storage to store the logits of the set of examples from the previous set of tasks. For example, the set of examples can be randomly selected logits from the old task, and the set of examples can be used to maintain classification from the previous tasks by matching these logits during the training on the new task.

As noted below, constrained memory usage is an important technical aspect of the solution as catastrophic forgetting is a technical problem that arises from practical, finite storage spaces, as there is not enough storage typically to maintain old knowledge. The problem of maintaining old knowledge is thus transformed into a tractable technical problem through the approaches of various embodiments described herein, and as noted in experimentation, improved results were obtained in respect of a subsequent set of tasks. Furthermore, Applicants note that the results were especially notable in relation to previous and subsequent tasks that are associated with one another through non-linear relationships (although it appears also to yield good results for linear relationships between the tasks as well).

The tasks are computational tasks, including, for example, conducting machine-automated classifications or predictions. The specific computational tasks being tested included image recognition (handwriting, image classification), and improved results are noted in this disclosure. However, Applicant notes that the implementations are not thus limited and the system can, in some embodiments, be applicable to other types of machine learning tasks wherein logits are used to guide outputs of the machine learning architecture.

The logits of the set of samples can be stored, for example, in a high-speed, constrained memory location/ storage device that can be used for quick retrieval and access during learning. An example constrained memory location can include a cache from a hierarchy of cache levels (e.g., L1, L2, L3, L4), among others, storing a selected subset of the logits from the first task. The amount of constrained memory available could constrain the amount of logits stored, in some embodiments, the amount of logits stored are based on the maximum amount of logits that can be stored in the constrained memory. As there is likely less space than needed to store the full set of logits, the subset can be randomly selected, in an example embodiment.

In another aspect, the logits are selected to reduce a dependency on representation of $D_1$.

In another aspect, during training on $D_2$, a penalty is applied for prediction deviation, the penalty according to the relation:

$$\min_\theta \frac{1}{n_2} \sum_i L(y_i^{(2)}, f_\theta(x_i^{(2)})) + \frac{1}{m} \sum_j L(f_1^*(x_j^{(1)}), f_\theta(x_j^{(1)}))$$

In another aspect, $L_2$ regularization is applied to the logits, in accordance with the relation:

$$\min_\theta \frac{1}{n_2} \sum_i L(y_i^{(2)}, f_\theta(x_i^{(2)})) + \frac{1}{m} \sum_j \|\hat{z}_j^{(1)} - \hat{z}_j^{(2)}\|_2^2,$$

where $\hat{z}_j^{(1)}, \hat{z}_j^{(2)}$ are the logits produced by $f_1^*$ and $f_\theta$ respectively.

In another aspect, the method includes applying a logits matching regularizer in accordance with the relation:

$$\mathcal{R}(\hat{\mathbb{P}}, \hat{\mathbb{Q}}) = \frac{1}{K} \sum_n \left(U_{\hat{\mathbb{P}}}(y) - U_{\hat{\mathbb{Q}}}(y)\right)^2$$

where:
(x, y) data pair.
ŷ predicted label
$\hat{\mathbb{P}}$ the output probability vector with logits $U_{\hat{\mathbb{P}}}$
$\hat{\mathbb{Q}}$ the output probability vector with logits $U_{\hat{\mathbb{Q}}}$
τ temperature hyperparameter
K number of classes In another aspect, the performance improvement is a reduction of a forgetting behavior.

In another aspect, the reduction of the forgetting behavior includes while training on $D_2$, the neural network is still effective for predicting on $D_1$.

In another aspect, the performance improvement is a reduction of a forgetting behavior while incurring a less substantial memory cost.

In an aspect, there is provided a computing device for improving performance of a deep neural network, the device comprising: a processor configured to storing, in computer memory, logits of a set of samples from a previous set of tasks ($D_1$); and the processor is configured to maintain classification information from the previous set of tasks by utilizing the logits for matching during training on a new set of tasks ($D_2$).

In an aspect, there is provided a computer readable memory storing machine interpretable instructions, which when executed, cause a processor to perform steps of a method as described above.

Corresponding computer systems, apparatuses, and processes to those described above.

Embodiments described herein can be performed in various orders, and are implemented on computer hardware and software devices.

In some embodiments, the systems are designed for improved neural network processing, such as for graphics/ image processing/recognition, pattern detection, among others, especially preferred for those applications where there is a need have a single neural network that is trained on different sets of tasks, and where there is a need to avoid catastrophic forgetting of the approaches utilized on prior sets of tasks.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 11 is the original heat map.

FIG. 12 is the heat map following forgetting what the predictions are using ADAM.

FIG. 13 is the heat map showing how matching logits manages to generalize well in terms of the prediction probabilities on the validation set.

FIG. 14 is the heat map showing how distillation is less effective when the memory is small.

DETAILED DESCRIPTION

Figure 1:
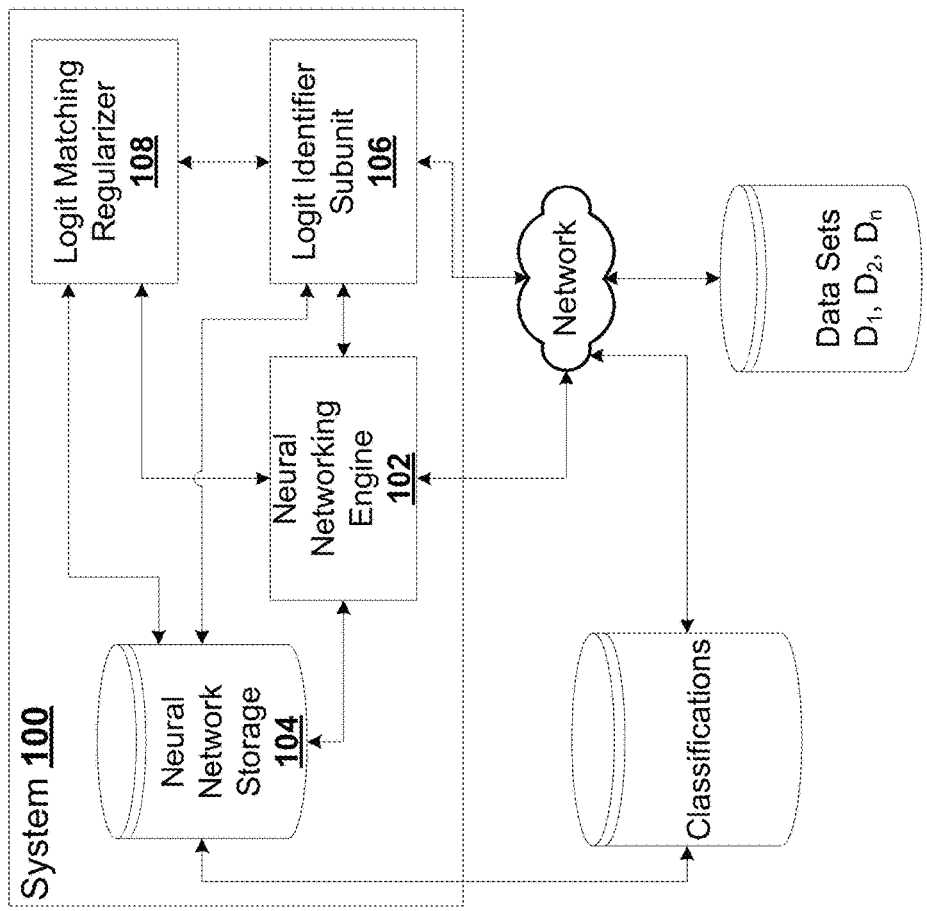
FIG. 1 is a block schematic diagram of an example system for improved neural networking while reducing effects of catastrophic forgetting, according to some embodiments.

Neural networks suffer from catastrophic forgetting, a technological problem in sequential learning of multiple tasks whereby previous knowledge is lost by mistake when new tasks are learned. This failure poses two limitations to deep neural nets. On the theoretical side, since an artificial general intelligence (AGI) needs to learn and solve different problems, it is inconceivable that a system which abruptly and unpredictably losses its existing skill as it encounters new problems can achieve AGI. On the practical side, real-world machine learning systems often continually need to adapt to streaming data and additional task requirements. Preventing sudden and unpredictable forgetting of old knowledge is a crucial quality assurance requirement. However, as computer memory is limited in neural networking systems, the system inevitably cannot store all old knowledge.

Catastrophic forgetting in neural networks is an inherent issue of distributed representation when trained sequentially. Neural network architectures can, for example, be implemented in computing systems operating in conjunction with computer memory that represent a set of computing nodes that are interconnected with one another. Training occurs as the neural network receives data sets representing features and outputs, and modifies the representation of the connection iteratively, for example, to optimize a particular output. Over time and a sufficiently large number of training examples, the neural network improves an ability to generate estimates, for example, generating computer-based estimated classifications. A last layer of nodes that is used for classifications can be described as a series of raw logits that represent raw prediction values (e.g., as real numbers).

Catastrophic forgetting is a technological problem that is sought to be avoided or mitigated, and it occurs as the same set of model parameters and representation space are used for multiple tasks, which could interfere with each other. When the model data architecture neural network, through iterative modifications of weights and filters representing interconnections between neural network nodes, learns (e.g., by adapting an overall transfer function) multiple tasks concurrently, the optimization generally does not cause catastrophic interference if the model has enough capacity.

However, if the tasks are learned sequentially, optimisation in a later stage could adapt shared parameters and usage of representation in ways that harm the old task. Therefore, the most straightforward way to ensure not losing old knowledge is to jointly train on old and new tasks, like in multi-task learning.

However, this approach was deemed intractable because previous stages' data need to be stored in memory and replayed back to the learner. This leads to impractical memory usage requirements and accordingly, impractical solutions that cannot be used feasibly in real-world computing systems.

Hence alternatives have been proposed: for example, using special neural architectural components that have internal dynamics; storing the sensitivity of previous task loss to parameters, and changing parameters in insensitive direction for the new tasks.

Applicants demonstrate an effective multi-task approach to avoid catastrophic forgetting with tractable memory requirement, in some embodiments. The following surprising observation is key to the effectiveness the method: if a neural net is already trained on a large dataset, then distillation or logit matching against itself on a few "anchor points" often ensures the stability of the learned function on the much larger dataset, against subsequent stochastic optimization for other objectives.

The multi-task approach is encapsulated in the form of an improved neural networking system, which is practically implemented using computing devices, including computer processor operating in conjunction with computer memory. The approach is provided as an improved computing device or system comprised of computing devices that is less prone to catastrophic forgetting due to the use of logit re-use.

A specific approach to logit re-use is provided that is designed to solve a technological problem by providing a combination of hardware and software that improves the functioning of a computer. Furthermore, as described herein, a computer memory efficient approach is described whereby only a small amount of additional memory is necessary (e.g., a cache memory storage adapted for storing logits and/or a limited set of data elements representing previous data).

Hence, in practice, it is possible to retain only a few input data points and the corresponding probability output vectors or logits by the learned classifier, which requires orders of magnitude less memory than storing all data, providing a tractable solution that has practical improvements in relation to reduction or mitigation of catastrophic forgetting that can occur in to neural network computing systems.

The system of some embodiments is configured to perform joint optimisation of learning new tasks and of distillation/logit matching to remind the old knowledge. The resulting few-shot reminding method forgets much slower than EWC on the permuted MNIST problem, dropping only 0.4% in average accuracy after five stages. The improved approach is computationally feasible and allows for practical implementation of improved neural networking systems.

Applicants also demonstrate the superiority of the proposed methods in continual learning of very different tasks by experimenting on non-linearly transformed MNIST tasks as well as colour space transformed CIFAR10.

In order not to forget what has been learned from earlier data, other approaches focused on matching previous models when training on new data. For example, consider the Elastic Weight Consolidation (EWC), which stores the sensitivity of previous task loss to different parameters, and penalizes model parameter changes from one task to the next according to the different sensitivities. Since the sensitivity based on the diagonal of the Fisher information matrix is very local, researchers have also considered the objective curvature during the whole training process. However, these approaches require to store all model parameters in their memory, which can be prohibitive because many neural networks involve millions of parameters.

On the contrary, the method described in some embodiments only needs to maintain a small memory of previous data and their corresponding logits, which can be much lesser than those storing the whole model. Learning without Forgetting (LwF) resembles the method described herein in some embodiments as both adopt the approach of matching model outputs.

A distinction with LwF is that LwF matches the predicted labels of previous models on the current data, while the method described herein in some embodiments matches the logits of previous models on the memory data. Moreover, LwF has two issues: (1) when the input distribution changes significantly across tasks, matching current data's outputs may not lead to good performance on the previous data and (2) it also needs to store the whole model from previous tasks, which is space intensive.

The approach of matching logits dates back to early work on model compression. Recent developments on compressing cumbersome neural networks have demonstrated that using a small amount of data and the model's outputs, either predicted labels or logits can very effectively mimic the predicting behavior of a large model. In some embodiments, the system adopts the same approach to solve the technical problem of catastrophic forgetting instead of model compression.

In the approach described in some embodiments, there is a focus on continual learning classification, in which the system will encounter a sequence of datasets $\mathcal{D}_1$, $\mathcal{D}_2$, $\cdots$, one at a time.

The goal is to attain a model $f_T: X \mapsto \Delta^C$, that maps data in the input space X to the C-dimensional probability simplex, and performs well on the first T datasets after training on the T sequential tasks. The value of T is not known in advance so it is desirable to have a good model $f_T$ for any T during the sequential training.

A data pair (x,y) consists of input data x in the input space X and its corresponding label y in the label space y. In the case of classification, the output space is usually the probability simplex $\Delta^C = \{y | 0 \leq y \leq 1, \|y\|_1 = 1\}$. A dataset $\mathcal{D}_t$ consists of data pairs $(x_i^{(t)}, y_i^{(t)})$ where $i=1, \cdots, n_t$ and $n_t$ is the number of data examples for the tth task. In continual learning, the system will encounter T datasets $\mathcal{D}_t$, $t=1, \cdots, T$, one at a time. After seeing $\mathcal{D}_T$, Applicants would like to attain a deep neural network $f_\theta: X \mapsto y$, parametrized by a vector $\theta \in \mathbb{R}^p$, that performs well on the datasets seen so far, in the sense that it will have low overall expected loss $\Sigma_{s=1}^T \mathbb{E}[L(f_\theta(x^{(s)}), y^{(s)})]$.

This learning problem is challenging in that, if Applicants simply re-train the same model over and over using the current available dataset $\mathcal{D}_T$, it will forget how to properly predict for datasets $\mathcal{D}_t$, $t \leq T$. This is known as the catastrophic forgetting problem, and is a technical problem that requires a technical solution to address while maintaining efficient usage of limited memory resources.

Alternative Approaches

A naïve approach to address this technological problem would be to store all the datasets thus far and jointly train a model in a multi-task fashion. This can certainly guarantee good overall performance for all the data so far. However, it demands a prohibitive memory size since in many real-world applications of neural networks, each dataset may have millions of data examples. Addressing this problem requires more memory-efficient solutions, which could yield reduced costs of implementation or reduced volume/power requirements to operate the neural network computing system.

One possible way is to memorize a previous model instead of actual data. For example, in the case of two tasks, EWC minimizes the training loss of the second task together with a penalty on deviation from first task's model:

$$\min_\theta \frac{1}{n_2} \sum_i L(y_i^{(2)}, f_\theta(x_i^{(2)})) + \frac{\lambda}{2} \|\theta - \theta_1^*\|_{F_1}^2$$

where $(x_i^{(2)}, y_i^{(2)})$ is data pair of $\mathcal{D}_2$, L is the KL divergence and f is parametrized by a vector $\theta \in \mathbb{R}^p$. It uses an approximated diagonal Fisher matrix $F_1$ to account for individual $\mathbb{R}$ parameter's contribution to the first task's loss. The memory cost of EWC is O(p) as it needs to store previous model's parameters $\theta_1^*$ and the corresponding Fisher.

This memory cost could be demanding since nowadays many deep neural networks can involve millions of parameters.

Improved Approach of Various Embodiments

In this subsection, Applicants will illustrate how embodiments described herein can solve a technological problem based on catastrophic forgetting without costing large memory resources.

FIG. 1 is a block schematic of an example system 100 for improved neural networking, according to some embodiments. The modules and subsystems shown are implemented using a combination of hardware and software, and may include embedded firmware and physical computing devices.

Processors, computer memory are utilized to provide an improved neural network which is adapted for improvements in relation to memory usage and solving issues with catastrophic forgetting that may occur in relation to learning a series of different sets of tasks. The neural network is an interconnected set of data objects adapted for iterative transitions and changes based on optimization through iterative training. There can be one or more layers of data objects, and an optimization, for example, could be the modification of weights in an effort to iteratively reduce error values generated by the neural network during training (e.g., an input is passed through the neural network, and if the neural network generates an incorrect classification (e.g., based on the correct outcome for the training pair) at the output stage, a penalty is propagated representing the error value. Conversely, if it is correct, a reward can be propagated to reinforce certain weights.

For example, the system 100, in some embodiments, is a hardware computer processor (or set of processors) that operates in conjunction with a computer memory and data storage, maintaining a neural network data architecture in the computer memory or the data storage in the form of neural network node data objects. There can be multiple layers of neural network node data objects, and these node data objects may be computationally coupled to one another, input node data objects, and output node data objects.

For example, the system 100 could be implemented as an improved computer server that operates within a data center as a special purpose machine adapted for reduced memory computation. The system 100 operates as a computational unit which has improved software or hardware elements that provide for improved training performance by including software that is adapted to modify how the neural network processes logits of examples from previous sets of tasks. As described herein, more specific variant embodiments are adapted to improved mechanisms for applying penalties for prediction deviation, applying $L_2$ regularization, among others.

The block schematic is provided as an example and there may be other, or different mechanisms shown, provided in different orders (permutations and/or combinations), etc. A neural networking engine 102 is shown that is configured for storing, in memory 104, logits of a set of samples from a previous set of tasks ($D_1$).

The neural networking engine 102 is further configured to maintain classification information from the previous set of tasks by utilizing the logits (e.g., identified by logit identifier subunit 106) for matching during training on a new set of tasks ($D_2$). Logit matching regularizer 108 is utilized to apply regularization to the logits, placing equal weights on all the logits. The $L_2$ regularizer can be a subunit of the processor, a separate processor, or be the same processor operating in respect of different machine-readable instruction sets stored in non-transitory computer readable memory.

Accordingly, the neural network stored in memory 104 is an improved neural network that is less prone to catastrophic failure.

Figure 2:
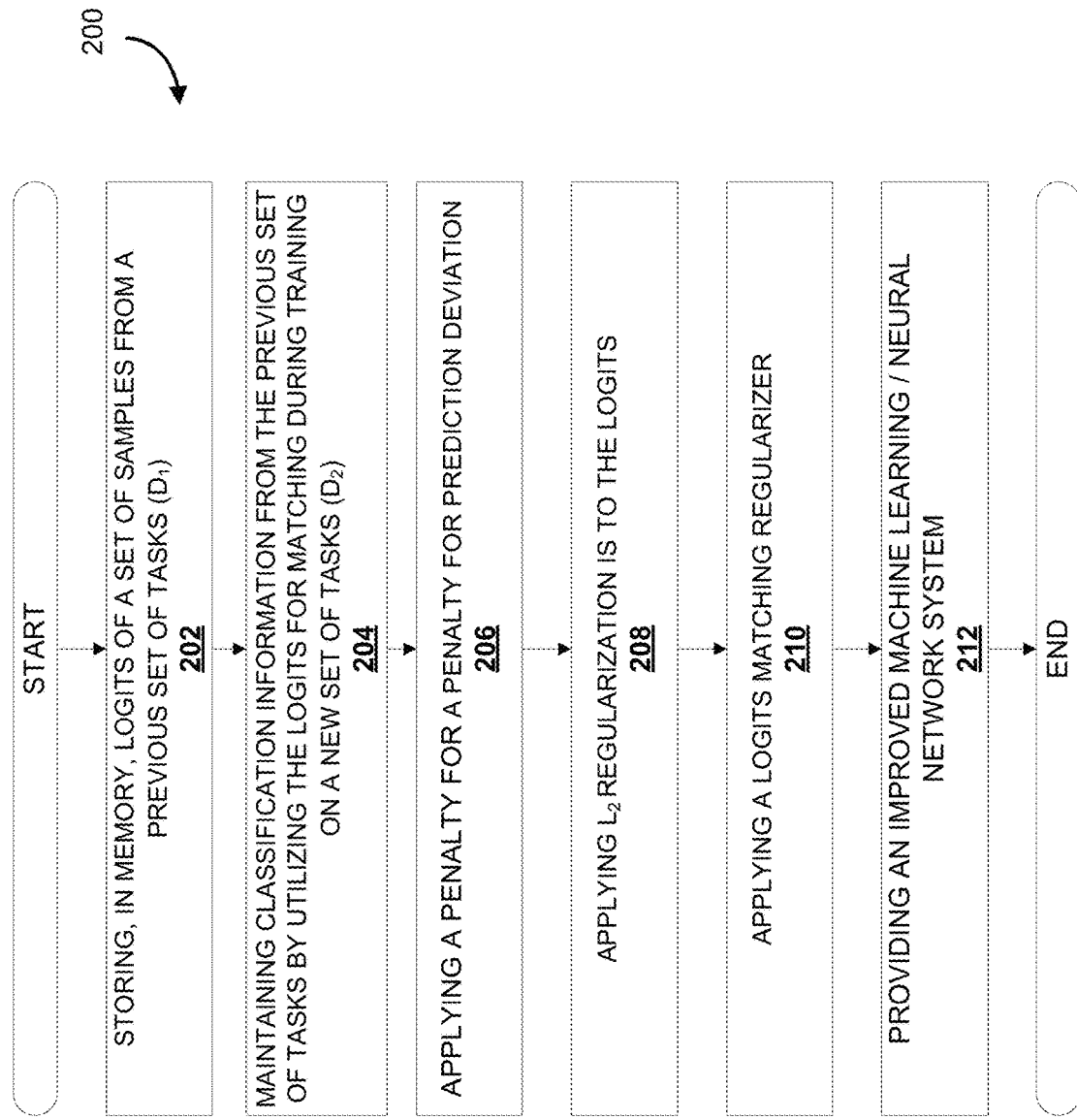
FIG. 2 is an example method diagram, according to some embodiments.

FIG. 2 is a method diagram illustrating an example method 200, according to some embodiments.

Recall that when training on $D_2$, not forgetting means that the model can still predict as well as $f_1^*$ (short for $f_{\theta_1^*}$ on $D_1$. Matching $\theta_1^*$ is just an intermediate step of this goal.

A more direct approach would be to match the outputs of $f_2$ and $f_1^*$ on $D_1$ and penalize significant deviation.

The distance of $\theta_2$ to $\theta_1^*$ is of less concern, as long as the predicting behaviors of $f_2$ remain similar to that of $f_1^*$. Therefore, the neural networking engine 102 is configured to focus on sampling a small memory $x_i^{(1)}$, i=1, •••, m from $D_1$ and match their outputs of $f_1^*$ when training $f_2$.

A natural question would be what outputs the system shall save in memory for later usage at 202.

Directly using the corresponding ground truth one-hot labels $y_i^{(1)}$, i=1, •••, m seems to be reasonable, but it depends too heavily on the generalization capability of the memorized data. If the selected examples are not representative enough, it could be difficult to perform well on the whole $D_1$.

Since the main goal is to not forget with a small memory cost m<<$n_1$, such dependency is likely to be problematic.

To understand more thoroughly on the predicting behavior of $f_1^*$, one need to look beyond its final prediction $\hat{y} \in \{1, \cdots, C\}$. For multi-class classification, a model f usually produces a probability vector $\hat{y}$ in the simplex and the final prediction would be the class with highest probability.

This probability vector, in fact, carries much information about the model's predicting behavior of each example, thus can be more suitable to store in memory.

When training on $D_2$ at 204, the neural networking engine 102 is configured to include a penalty for prediction deviation at 206:

$$\min_\theta \frac{1}{n_2} \sum_i L(y_i^{(2)}, f_\theta(x_i^{(2)})) + \frac{1}{m} \sum_j L(f_1^*(x_j^{(1)}), f_\theta(x_j^{(1)}))$$

The second term resembles model distillation, which was originally proposed to solve the model compression problem. Here, distillation is applied for the purpose of not forgetting.

Interestingly, the output probability vector does not provide complete information about the model outputs.

For many neural network architectures, the probability vector is the result of the softmax transformation of the logits $\hat{z}$:

$$\hat{y} = \sigma(\hat{z}) = \frac{\exp(\hat{z})}{1^\top \exp(\hat{z})},$$

where 1 is the vector of all 1s.

Note that the softmax transformation is shift-invariant: adding any constant to the logits will not affect the probability vector. The shift on the logits for each individual example in the memory can be helpful for mimicking the original model.

Therefore, in order to fully reproduce the predicting behavior of a model, in some embodiments, the system is configured to apply $L_2$ regularization at 208 on the original logits:

$$\min_\theta \frac{1}{n_2} \sum_i L(y_i^{(2)}, f_\theta(x_i^{(2)})) + \frac{1}{m} \sum_j \|\hat{z}_j^{(1)} - \hat{z}_j^{(2)}\|_2^2,$$

where $\hat{z}_j^{(1)}, \hat{z}_j^{(2)}$ are the logits produced by $f_1^*$ and $f_\theta$ respectively.

An improved method is described below, for the following variables:
(x,y) data pair.
$\hat{y}$ predicted label
$\hat{\mathbb{P}}$ the output probability vector with logits $U_{\hat{\mathbb{P}}}$
$\hat{\mathbb{Q}}$ the output probability vector with logits $U_{\hat{\mathbb{Q}}}$
τ temperature hyperparameter
K number of classes The logits matching regularizer is proposed (and applied at 210) as follows:

$$\mathcal{R}(\hat{\mathbb{P}}, \hat{\mathbb{Q}}) = \frac{1}{K} \sum{}^{y} (U_{\hat{\mathbb{P}}}(y) - U_{\hat{\mathbb{Q}}}(y))^2. \quad \text{(Eq. 1, eq:logitsmatching)}$$

The improved neural network is available for receiving additional sets of data for training (e.g., $D_n$) at 212.

Comparison with Distillation Method

Recall that the method of distillation augments the objective function by an extra regularizer that is defined by the KL diversion between the predicted label distributions of the previous model and the current model, as follows:

$$D_{KL}(\hat{\mathbb{P}} \| \hat{\mathbb{Q}}) = \sum{}^{y} \hat{\mathbb{P}}(y)(\log \hat{\mathbb{P}}(y) - \log \hat{\mathbb{Q}}(y)) = \sum{}^{y} \hat{\mathbb{P}}(y)(U_{\hat{\mathbb{P}}}(y)/\tau - U_{\hat{\mathbb{Q}}}(y)/\tau) + (Z_{\hat{\mathbb{P}}} - Z_{\hat{\mathbb{Q}}}), \quad \text{(Eq. 2, eq:distillation)}$$

where $\tau$ is the temperature hyperparameter, and $Z_{\hat{\mathbb{P}}} = \log \Sigma^y \exp(U_{\hat{\mathbb{P}}}(y)/\tau)$ is the normalizer for the softmax function.

One immediate observation is that the softmax function is invariant in constant shift in its logits, thus matching logits is a stronger requirement compared to matching probability output. Assuming that $Z_{\hat{\mathbb{P}}} = Z_{\hat{\mathbb{Q}}}$, [eq:distillation] can be interpreted as a weighted sum of the logits mismatches. It further proposes to use a large temperature for distillation so that the regularizer would not focus only on the predicted label 1.

Compared to distillation in [eq:distillation], matching logits in [eq:logitsmatching] places equal weights on all the logits, which automatically solve the above "predicted-label-focus" problem, and seems more intuitive for remembering more information, rather than only its prediction, of the previous model.

Experimental Evaluation

Applicant presents the experimental results in this section. Applicants' method is tested across various setting of learning a sequence of related classification tasks. The first setting is the permuted MNIST, a benchmark.

Observing that all the permutations are linear, Applicants further design a sequence of learning tasks of MNIST with non-linear (but reversible) transformations. To test on a more realistic scenario, Applicants conduct further experiments on the CIFAR10 $\hat{\mathbb{P}}$

[1] Note that for a confident model which assigns $\hat{\mathbb{P}}(\hat{y})$ close to 1, *** dataset. Instead of permuting the pixels, Applicants use the same images but represent them in different color spaces as different tasks.

A naive baseline would be the standard optimization algorithm ignoring the problem structure. The performance of matching logits is compared to EWC, a popular method.

Applicants also compare the method with Distillation that carries a similar matching idea. Applicants have tried Learning without Forgetting (LwF), which resembles the distillation approach. However its performance in the settings is worse than the alternatives, and sometimes even worse than the baseline. This could be due to its problem with shifted x distributions.

Therefore, Applicants do not include LwF in the results. The results consistently show that logits matching and distillation significantly outperform other existing state-of-the-art methods when using a comparable (or even much less) memory size.

Moreover, Applicants reduce the available memory size for the method to test the effectiveness of the method and distillation, which Applicants denote as "few shot reminding". Experimental results suggest that matching logits manages to carry more information from the previous tasks to the new task, thus more effective.

Effect of Not Forgetting

Permuted MNIST. Applicants first compare the performance of the method to SGD, EWC, and distillation, on the task of permuted MNIST. For each of the sequential tasks, the pixels of the each original MNIST image are randomly shuffled according to a random but fixed permutation.

The model Applicants use is a five-layer fully connected multilayer perceptron (MLP) with 1024 hidden units except the last layer, which is 10 for the output classes.

Applicants use a richer model than those of prior works due to the fact that Applicants will use the same model for learning non-linear transformed MNIST later, which is a significantly more challenging problem. Except SGD, all other methods are trained using the Adam optimizer with step size of 0.0001. The regularization strength of each method is individually tuned with a large range of candidates, based on a hold-out validation partition. The best regularization parameters of logits/distill/EWC are 5, 10, 400 respectively.

Applicants randomly select 1900 class-balanced MNIST images per task as memory for logits matching and distillation, which in total is comparable to the memory cost of EWC (memory computation and further experiment details can be found below).

Figure 3:
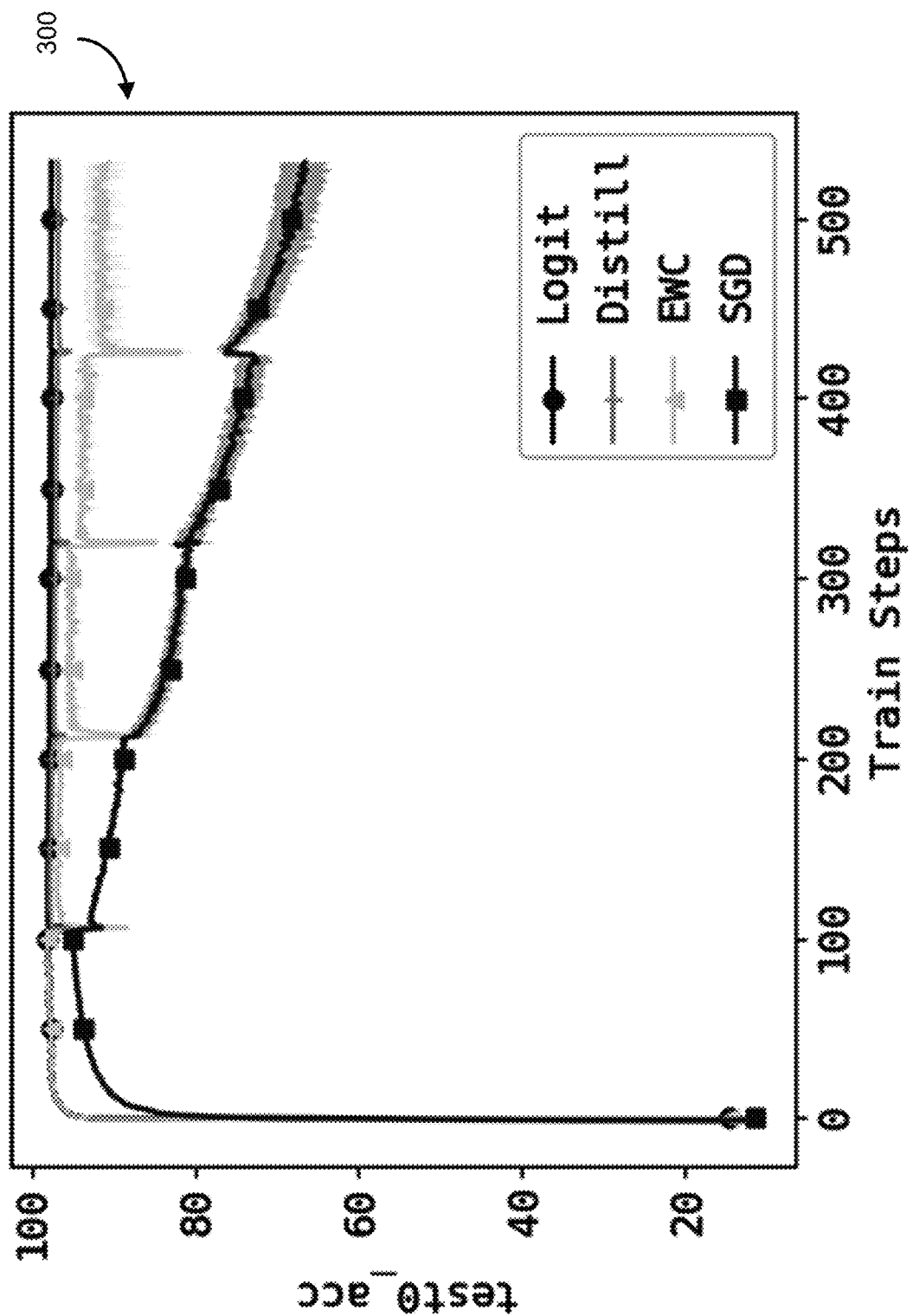
FIG. 3 is an example graph of permuted MNIST test accuracy for a first task, according to some embodiments.
Figure 4:
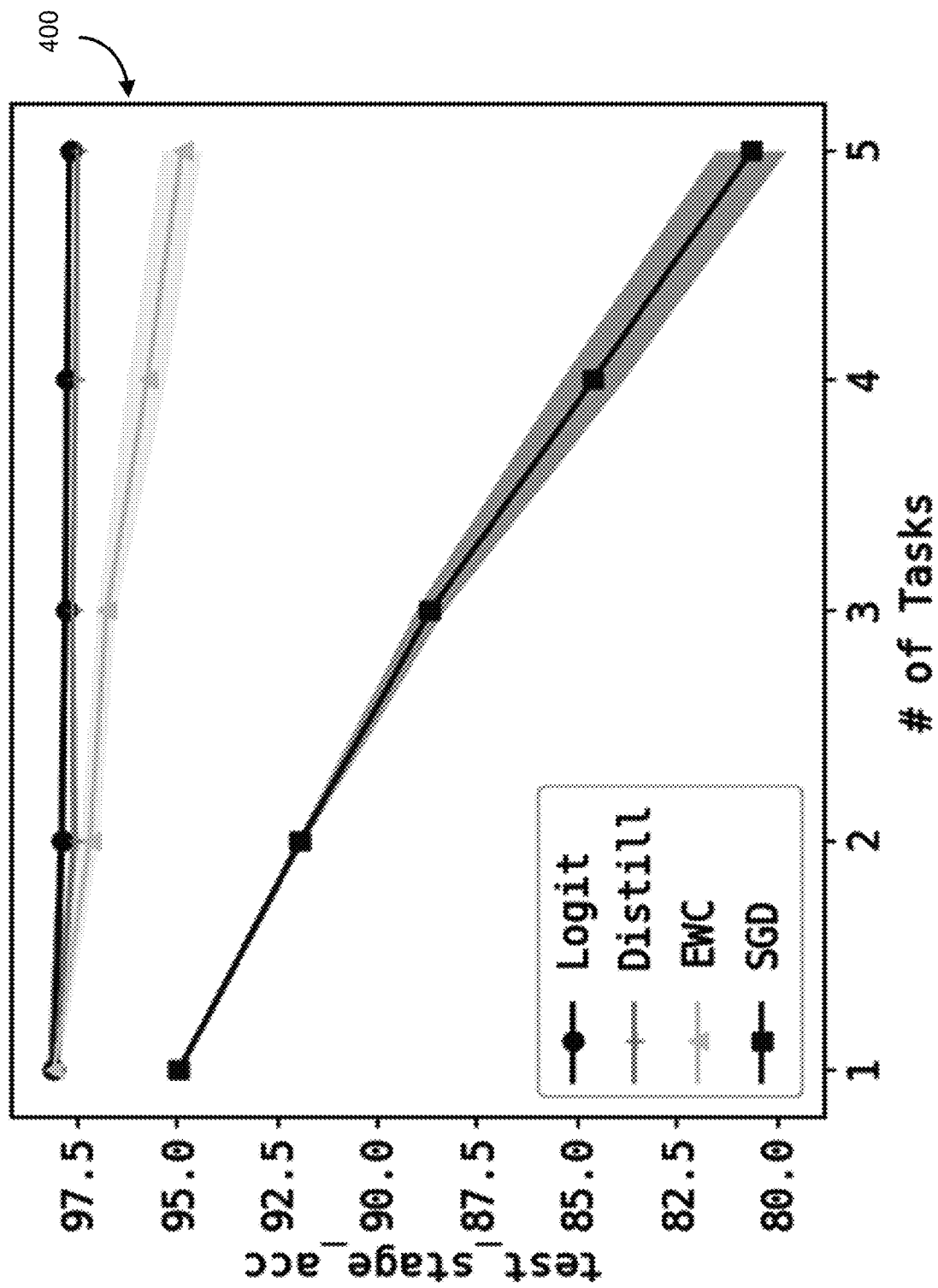
FIG. 4 is an example graph of permuted MNIST test accuracy as provided for a task average, according to some embodiments.

The results are shown in FIG. 3 and FIG. 4. FIG. 3 is a diagram 300 that shows the test accuracy of the first task over the training of five sequential tasks, while FIG. 4 is a diagram 400 that shows the average test accuracy of tasks that have been seen so far. FIG. 3, the y axis should start from 60%.

Applicants can observe that (1) all methods outperform SGD by a large margin, (2) matching logits and distillation have a significant improvement over EWC when using comparable memory size.

Note that pixel permutation is a linear transformation of the original image, so if the model can successfully accommodate different permutations in the very first hidden layer, subsequent layers' parameters need not to change in order to maintain a good overall accuracy. Therefore, permuted MNIST is a relatively less complex problem.

To see how the methods perform for more difficult tasks, so Applicants have composed a more challenging scenario from the MNIST dataset below.

Non-Linear MNIST.

Figure 5C:
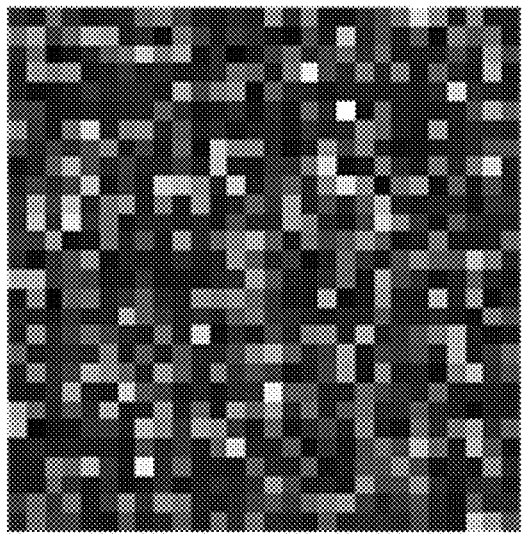
FIG. 5A-5C show examples of different transforms (original, permuted, non-linear), according to some embodiments.
Figure 5B:
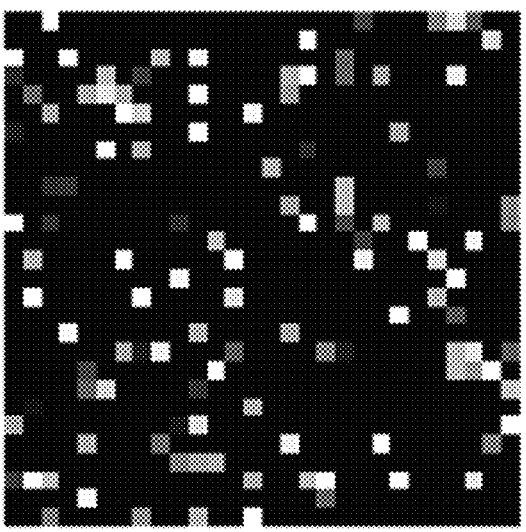
Figure 5A:
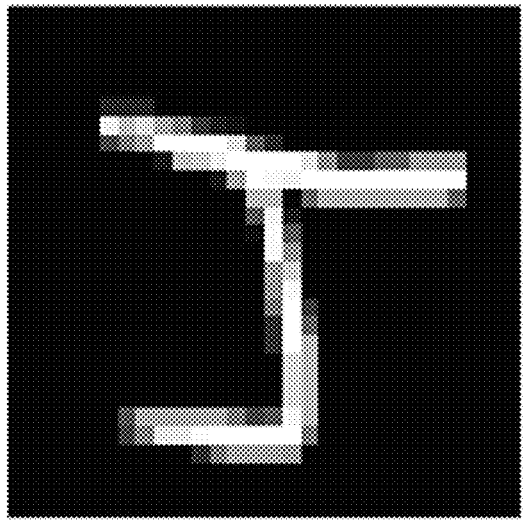

Applicants compose a new task by a non-linear transformation of the original MNIST data. Particularly, Applicants apply a four-layer fully connected MLP with orthogonally initialized weights and Leaky ReLU ($\alpha$=0.2) to the original MNIST data. All layers have the same number of units (784) and the output image is re-normalized to the [0,1] range. Each task corresponds to a different orthogonal initialization. Such non-linear transformation is lossless since every step of the transformation is reversible. An example image of nonlinear transformation is shown in FIG. 5A (original), FIG. 5B (permuted), and FIG. 5C (non-linear), examples of different transforms. The best regularization parameters of logits/distill/EWC are 1, 10, 10 respectively.

Figure 6:
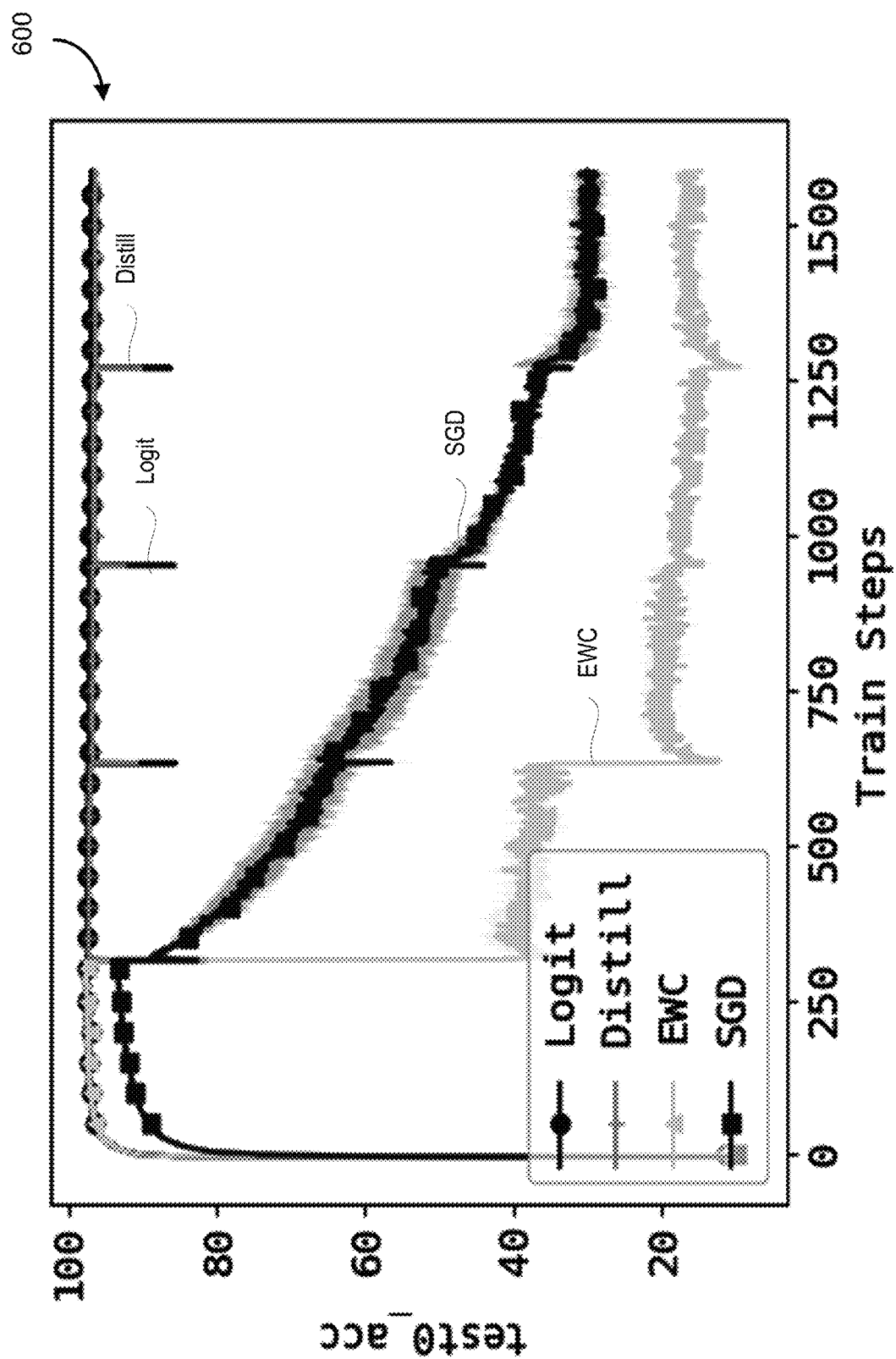
FIG. 6 is an example graph of non-linear permuted MNIST test accuracy for a first task, according to some embodiments.
Figure 7:
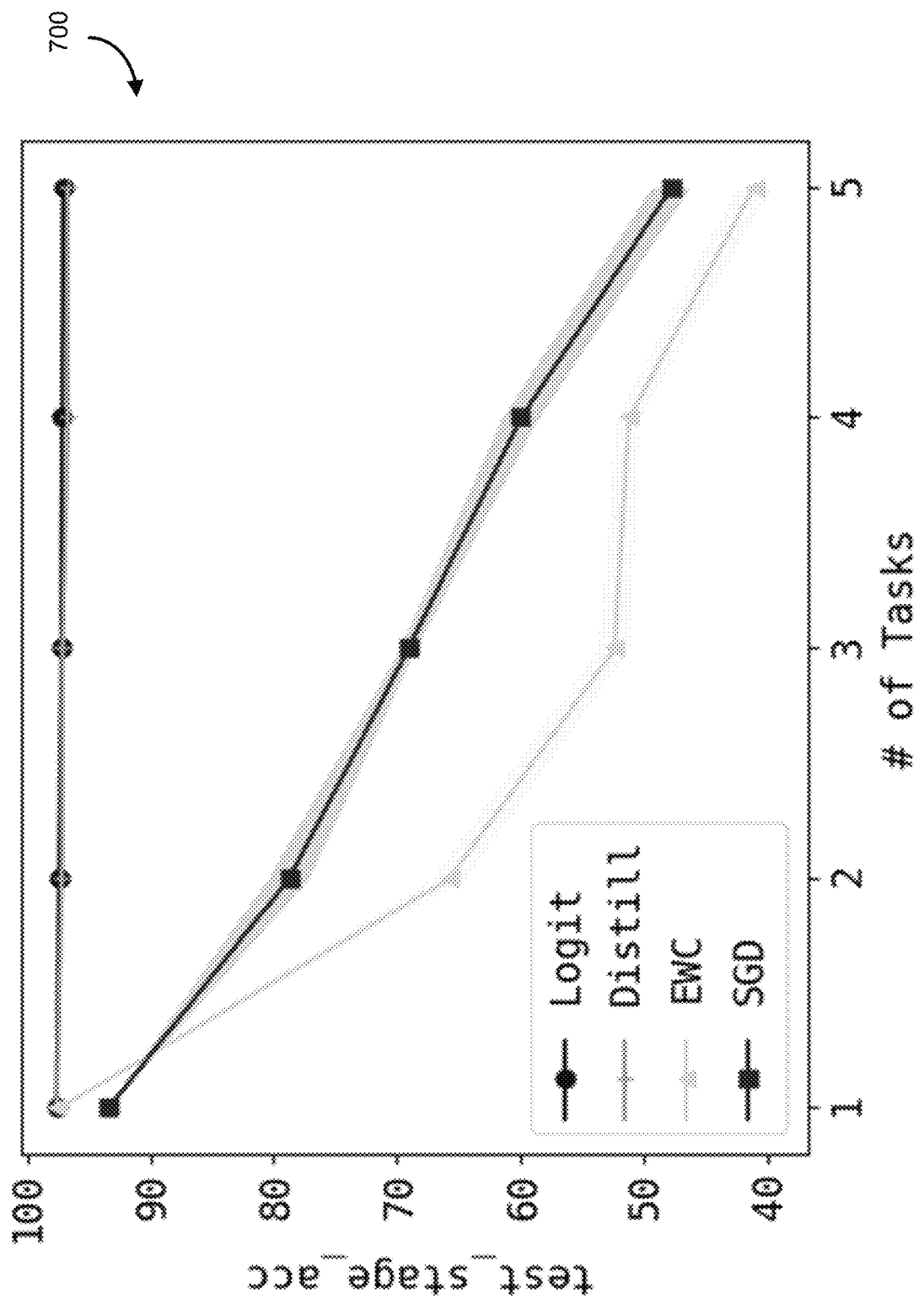
FIG. 7 is an example graph of non-linear permuted MNIST test accuracy as provided for a task average, according to some embodiments.

The results are shown in FIG. 6 and FIG. 7. FIG. 6 is a diagram 600 that shows the outcome for the first task, and FIG. 7 is a diagram 700 that shows the outcome for the tasks on average. As Applicants anticipated, when data distributions are much different from task to task, approaches that match model parameters like EWC can fail miserably. Essentially, EWC only utilizes local information as the diagonal Fisher matrix. When the two optimal solutions of two tasks are far apart, the local information of the first task is no longer accurate during the training process of the second task, and there might not be overlap for the two estimated Gaussian ellipsoids.

On the contrary, methods that solely match the output of previous models like logits or labels can maintain a remarkably better performance than EWC. The transformations of MNIST, either linear or non-linear, are more or less artificial and will rarely encounter in real-world applications. In the following, Applicants will provide a more realistic experiment on the CIFAR10 dataset where different color space representations are used as different tasks.

CIFAR10. Applicants further test an embodiment of the method on CIFAR10. The original CIFAR10 is based on RGB color encoding. Applicants use the color space transformations available in the scikit-image library[2] to generate representations in different color spaces as different tasks.

[2] scikit-image.org

The five color spaces used in the experiments are RGB, YIQ, YUV, HSV, HED (order as listed). The YIQ and YUV spaces are linear transformations of the RGB space, while HSV and HED are non-linear transformations. This ordering ensures that the tasks are getting sequentially harder and the forgetting phenomenon is getting more and more profound. A VGG-like model with enough hidden units (details can be found in the appendix) is used for this learning task to accommodate different color space inputs. 3000 class-balanced images are randomly chosen from each task as memory, which in total is comparable to the memory usage of EWC. Similarly, the regularization parameter of each method is individually tuned based on a hold-out validation partition. The best parameters for logits/distill/EWC are 0.1, 10, 10 respectively.

Figure 8:
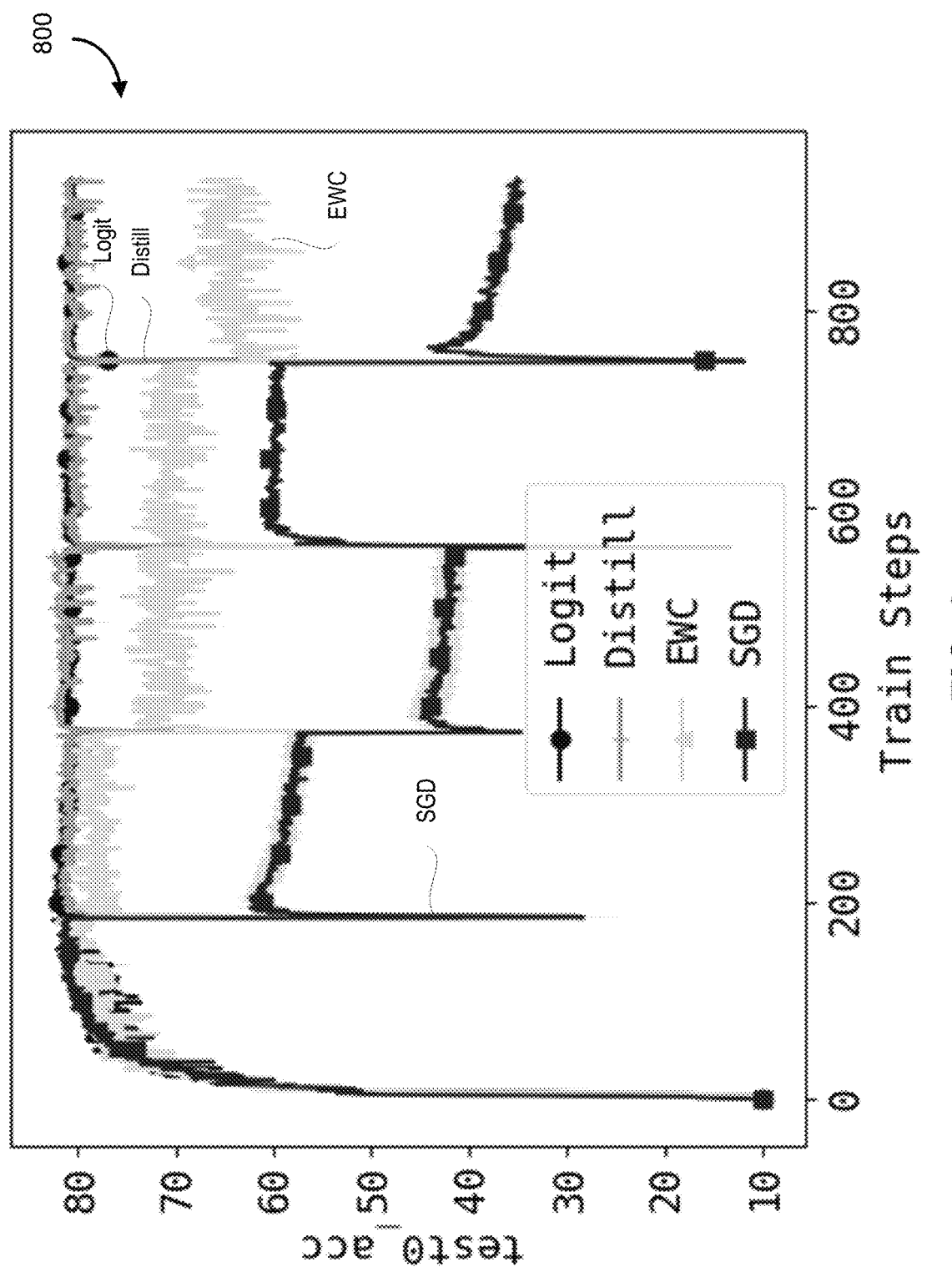
FIG. 8 is an example graph of CIFAR10 test accuracy for a first task, according to some embodiments.
Figure 9:
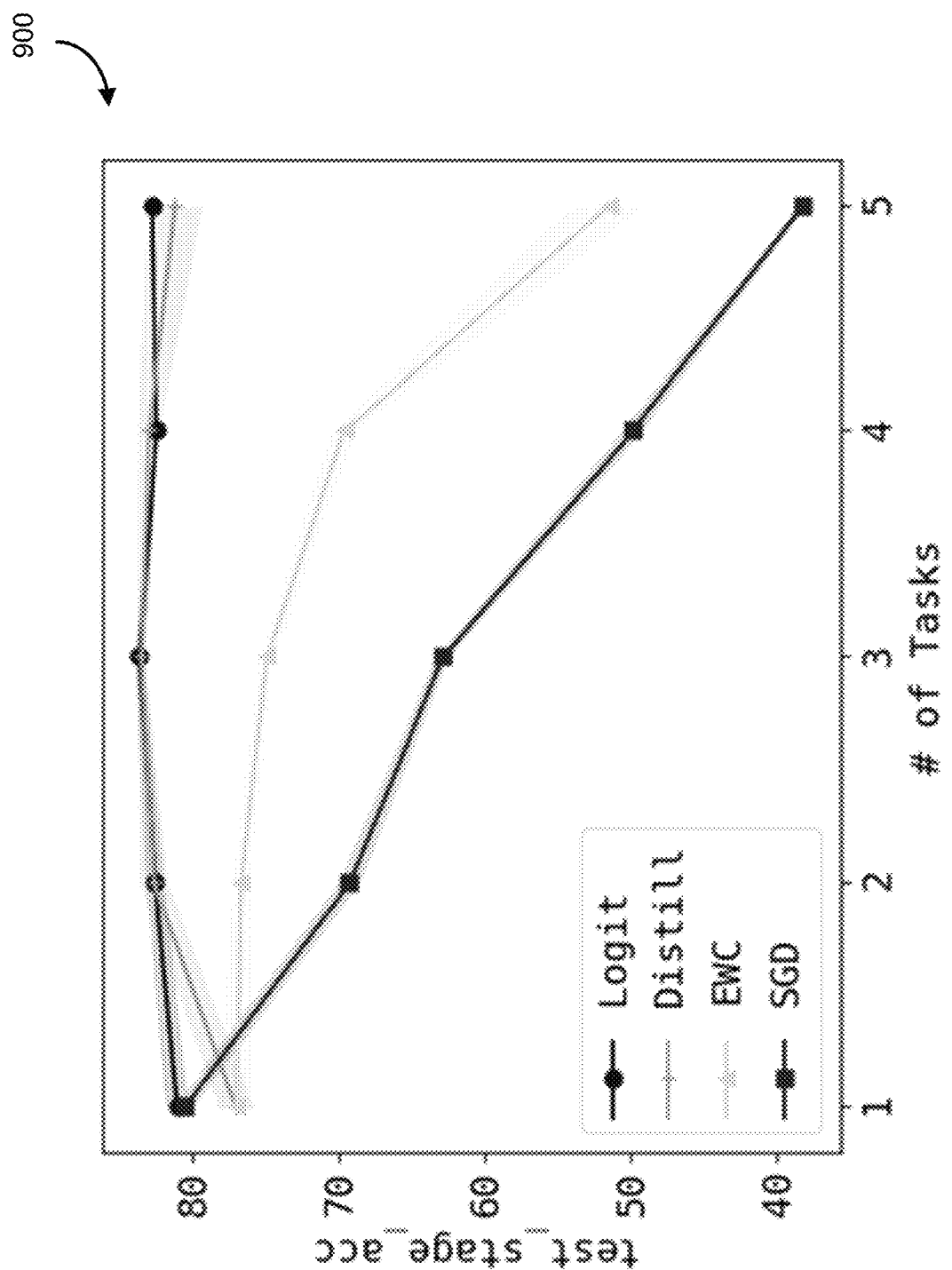
FIG. 9 is an example graph of CIFAR10 test accuracy as provided for a task average, according to some embodiments.

The results are shown in FIG. 8 (first task, diagram 800) and FIG. 9 (task average, diagram 900). It can be seen that without considering previous tasks, SGD forgets quickly as the model encounter images represented in a new color space. EWC can maintain a reasonably good overall accuracy when the transformation is linear, but when the transformation becomes non-linear, its accuracy drops significantly. Meanwhile, matching logits and distillation can preserve or even improve average test accuracy.

Few Shot Reminding via Logits Matching

To further exam the effectiveness of the method, Applicants test the method with small memory. The method can surprisingly do well in "few shot reminding" setting, where the algorithm succeeds in remembering information of the previous tasks by memorizing only a few images, i.e., a few images are sufficient to remind the algorithm about the previous tasks. Applicants focus on the permuted MNIST setting and show the effect of different memory sizes in Table 1. There are a few interesting observations, as Applicants will discuss below.

TABLE 1

| Mem Size/Task | Method | # of tasks 1 | # of tasks 2 | # of tasks 3 | # of tasks 4 | # of tasks 5 |
|---|---|---|---|---|---|---|
| 0 | Adam | 98.08 (0.15) | 62.23 (0.53) | 52.36 (0.70) | 41.74 (0.87) | 37.48 (0.81) |
| 10 | Logit | 97.48 (0.52) | 95.43 (0.24) | 92.40 (0.31) | 89.38 (0.47) | 86.00 (0.29) |
| 10 | Distill | 97.48 (0.52) | 84.47 (1.51) | 75.04 (0.83) | 69.16 (1.00) | 64.29 (0.68) |
| 50 | Logit | 98.14 (0.08) | 96.95 (0.09) | 95.94 (0.10) | 95.08 (0.12) | 94.26 (0.10) |
| 50 | Distill | 98.14 (0.08) | 93.66 (0.16) | 90.36 (0.37) | 87.99 (0.40) | 86.08 (0.25) |
| 100 | Logit | 97.94 (0.07) | 97.11 (0.04) | 96.54 (0.11) | 96.00 (0.12) | 95.47 (0.12) |
| 100 | Distill | 97.94 (0.07) | 95.66 (0.06) | 93.58 (0.30) | 92.52 (0.28) | 91.38 (0.19) |
| 500 | Logit | 97.83 (0.20) | 97.57 (0.13) | 97.39 (0.08) | 97.27 (0.05) | 97.17 (0.05) |
| 500 | Distill | 97.83 (0.20) | 97.09 (0.05) | 96.71 (0.11) | 96.37 (0.15) | 96.29 (0.07) |
| 1000 | Logit | 98.05 (0.07) | 97.85 (0.02) | 97.69 (0.02) | 97.62 (0.02) | 97.52 (0.01) |
| 1000 | Distill | 98.05 (0.07) | 97.65 (0.03) | 97.31 (0.07) | 97.12 (0.04) | 96.96 (0.12) |
| 1900 | Logit | 98.08 (0.15) | 97.87 (0.09) | 97.78 (0.07) | 97.74 (0.05) | 97.67 (0.05) |
| 1900 | Distill | 98.08 (0.15) | 97.55 (0.12) | 97.60 (0.05) | 97.52 (0.01) | 97.47 (0.03) |
| ≈1994 | EWC | 98.08 (0.15) | 97.16 (0.23) | 96.74 (0.23) | 95.74 (0.50) | 94.85 (0.50) |
| 0 | SGD | 94.95 (0.07) | 91.90 (0.11) | 88.65 (0.36) | 84.61 (0.78) | 80.62 (0.88) |
| 0 | SGD | 94.95 (0.07) | 91.90 (0.11) | 88.65 (0.36) | 84.61 (0.78) | 80.62 (0.88) |

(1) More aggressive optimizer like Adam tends to forget much quicker than vanilla SGD, as seen in the first and last data rows of the table. This is an interesting observation that has rarely been discussed in the catastrophic forgetting literature.

It may be explained by the fact that adaptive optimizers usually find local optimum of the new task quicker than SGD, which also indicates that they are more inclined to move away from previous solutions. However, the exact reasons for the forgetting behavior of adaptive optimizer is out of the scope of this analysis and require further investigation.

(2) Strikingly, even with only 1 image per class (a memory size of 10 images per task), matching logits can improved over SGD by a noticeable margin. Recall that Applicants match logits with the Adam optimizer, which means that even with only 1 randomly chosen image per class can remedy the forgetting issue of Adam.

Figure 10A:
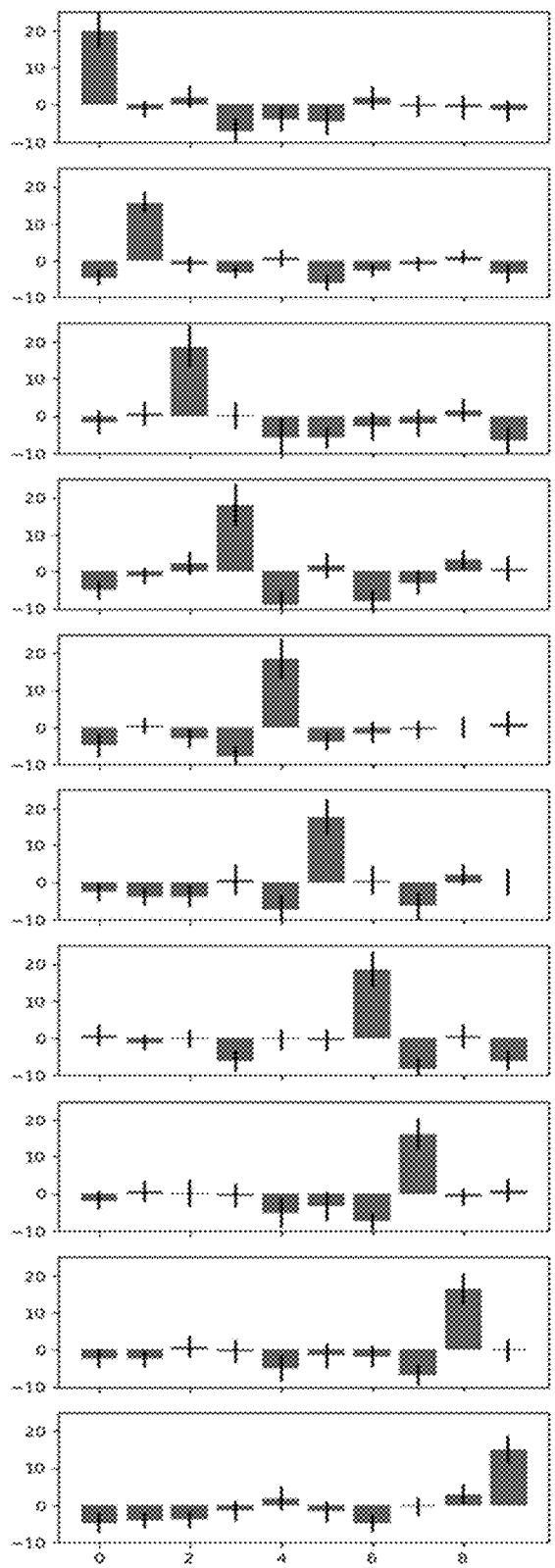
FIG. 10A are bar graphs showing shows means and standard deviations of logits, original, according to some embodiments.

(3) With 10 images per class (thus 100 images per task), matching logits can outperform EWC for this problem. It is surprising that matching logits can perform so well, provided that it only uses 100/1994≈5% of the memory cost of EWC. To better understand the effectiveness of the method, the logits distributions of each MNIST class are provided in FIG. 10A and FIG. 10B. FIG. 10A shows the average logits of images of each class in the hold-out validation partition, after training on the first task. The first subplot in FIG. 10A shows the average logits of images labeled as '0', together with their standard deviations as error bars.

The rest of the subplots are similarly defined. Clearly, the model has successfully distinguished between different classes by making the correct labels' logits much higher than those of the incorrect labels.

Figure 10B:
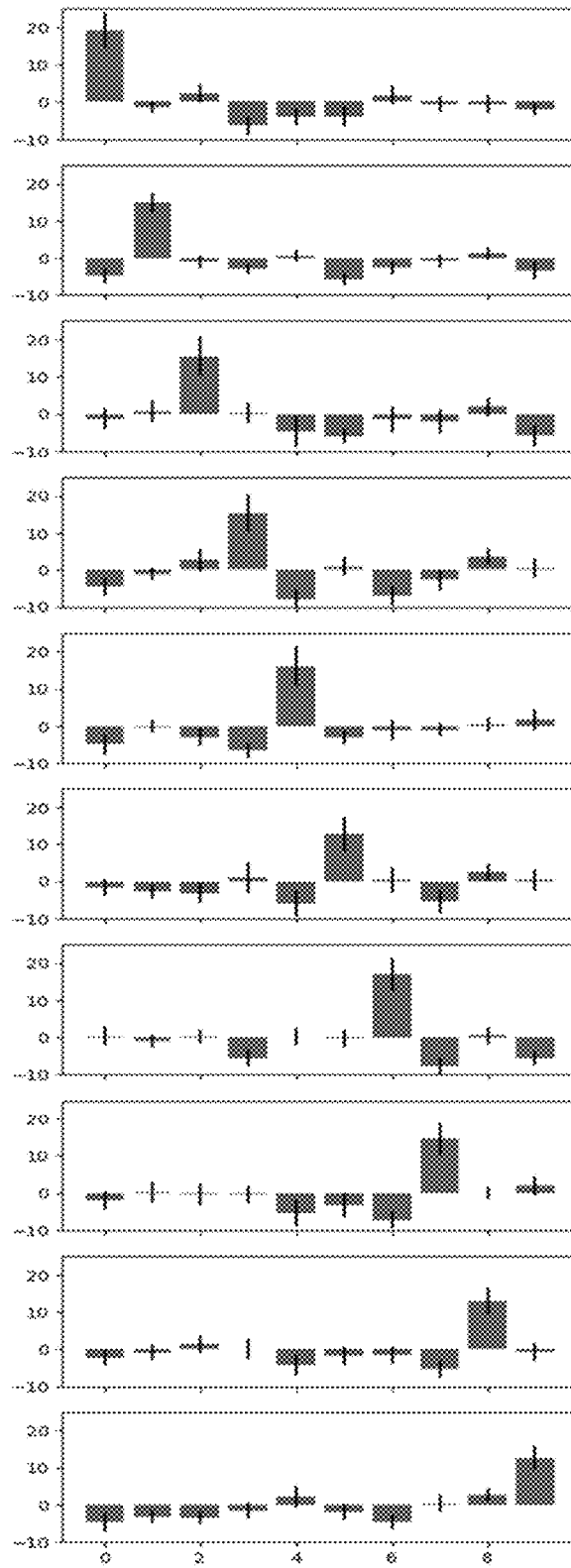
FIG. 10B are bar graphs showing shows means and standard deviations of logits, 10 per class, according to some embodiments.

FIG. 10B shows the same (of first task validation data) after training on the second task with 10 images per class as memory. Even with such small memory, matching logits can generalize very well for unseen data in the first task, which explains why it could be more favorable when the memory budget is tight. What is the limit on the number of the tasks such that logits matching can still perform relatively well ($\geq 50\%$)?

Figure 11:
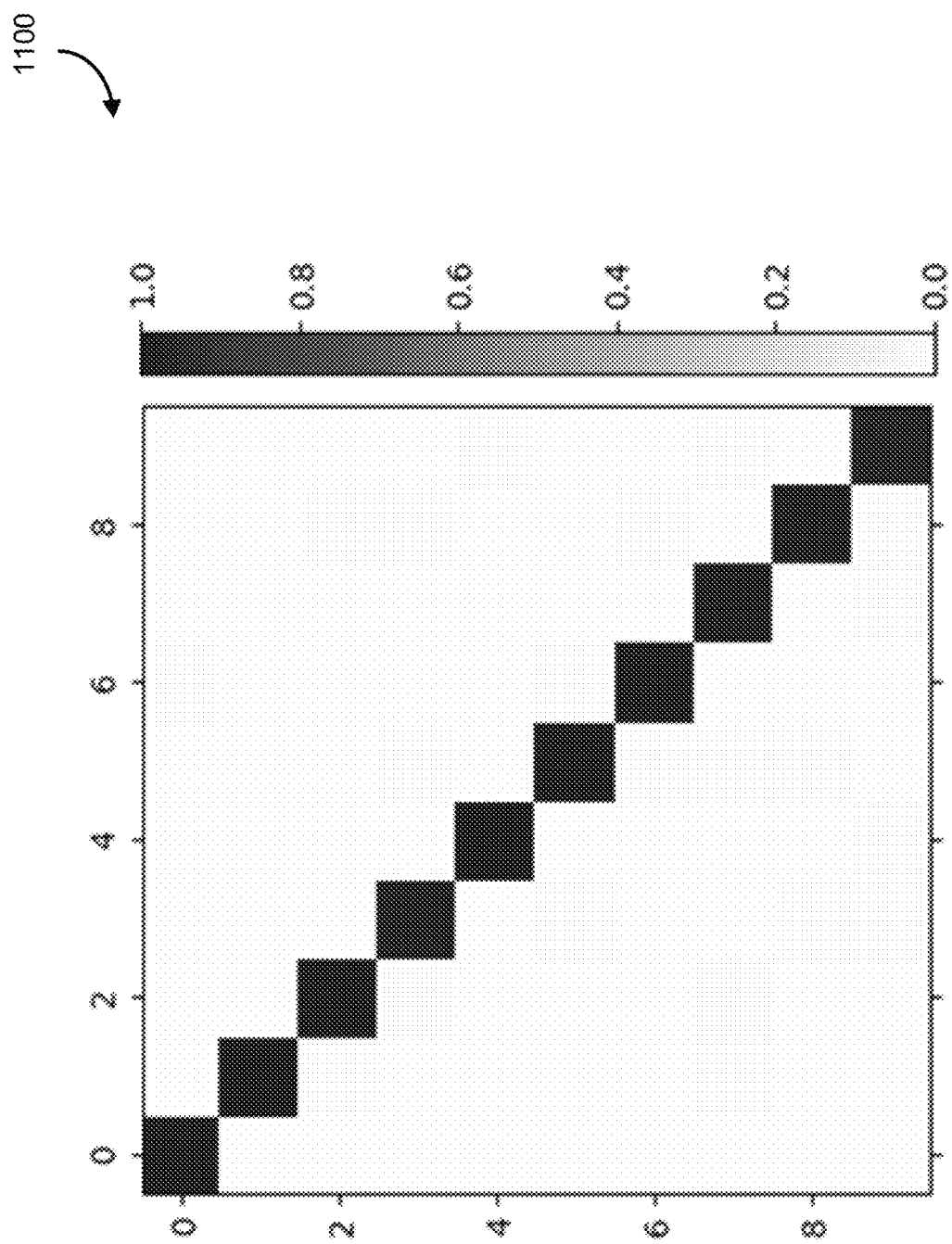
FIG. 11 is a prediction heat map where each row shows the average probabilities of corresponding class images.
Figure 12:
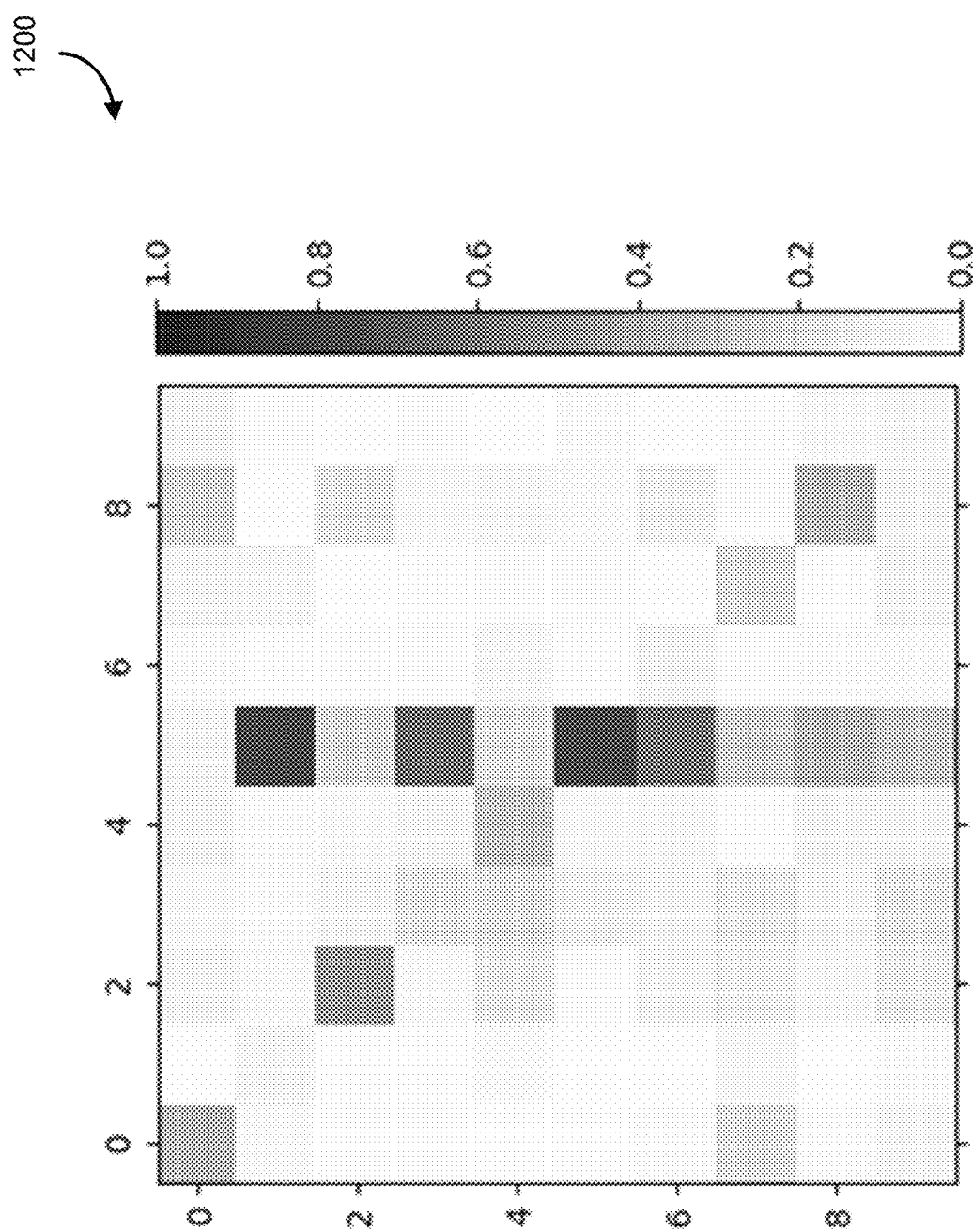
FIG. 12 is a prediction heat map where each row shows the average probabilities of corresponding class images.
Figure 13:
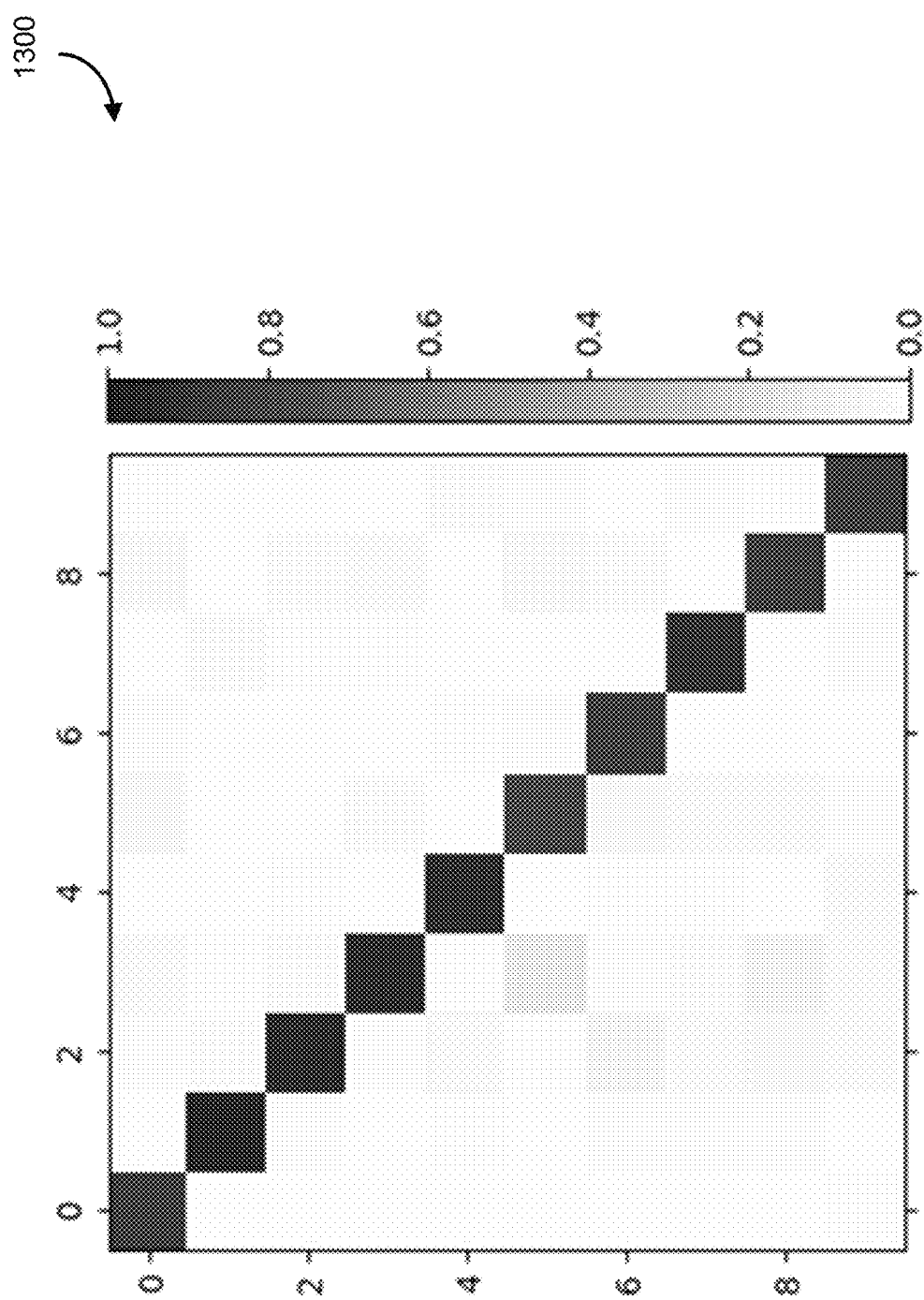
FIG. 13 is a prediction heat map where each row shows the average probabilities of corresponding class images.
Figure 14:
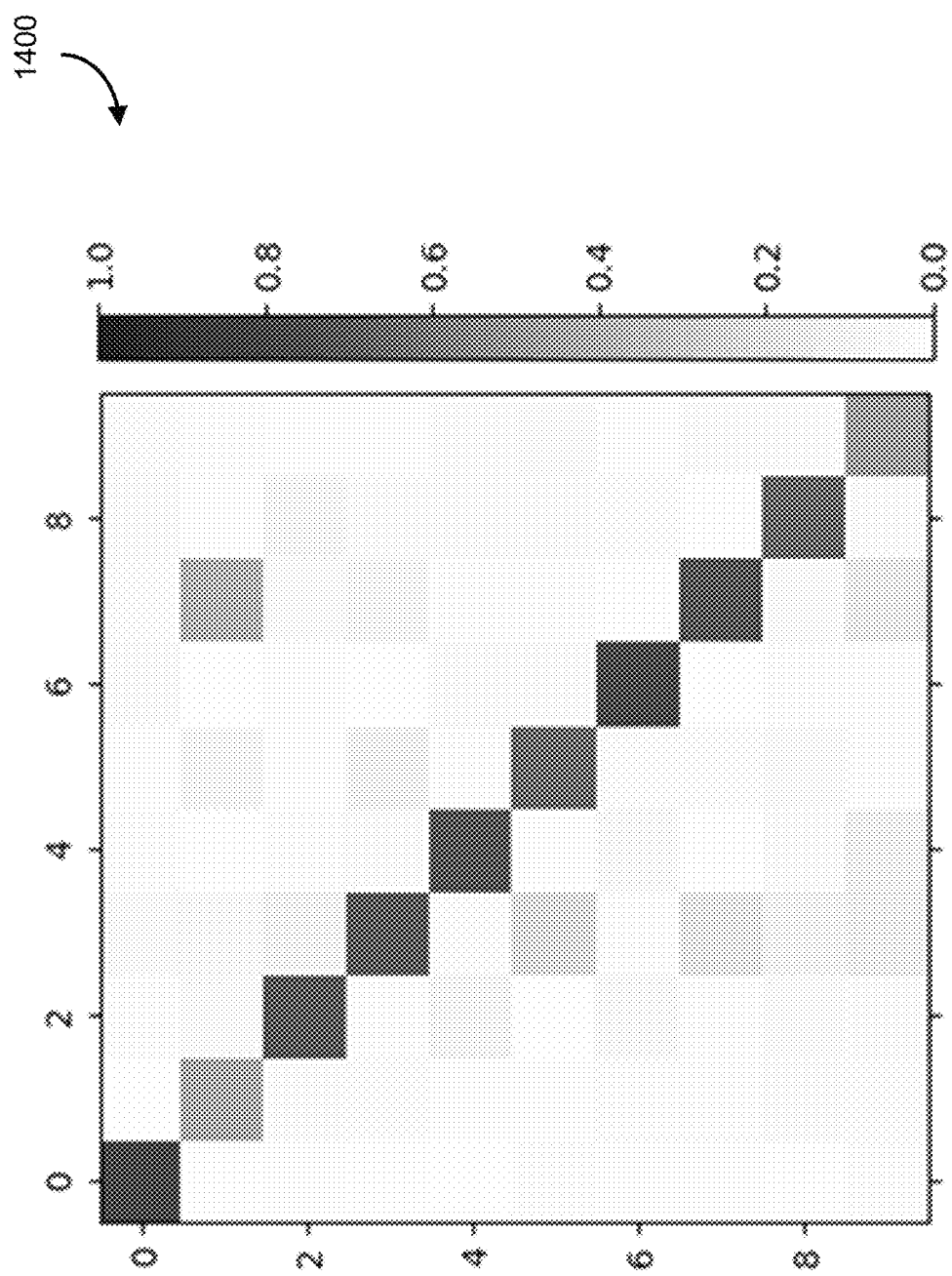
FIG. 14 is a prediction heat map where each row shows the average probabilities of corresponding class images.

(4) Back to Table 1, matching logits consistently performs better than distillation, across all memory sizes. Their accuracy differences are more significant with smaller memory sizes. To see why matching logits is more effective, Applicants have shown the prediction heatmap 1100 in FIG. 11. In each subplot, each row shows the average probabilities of the corresponding class images. For instance, the first row is the average predicted probabilities of images of class '0' in the validation partition after training on the first task. Using Adam, the model forgets what the predictions of the first task data should be after training on the second task, as shown in the heatmap 1200 of FIG. 12. With only 1 single randomly chosen image per class, FIG. 13 is a heatmap 1300 that shows how matching logits manages to generalize well in terms of the prediction probabilities on the validation set. On the contrary, distillation is less effective when the memory is small, as in FIG. 14 the heatmap of 1400.

Experiment Details
# of epochs: 20 (permuted MNIST), 60 (non-linear MNIST), 40 (CIFAR10).
Batch size 128
Weight decay 0.0001
5 runs
temperature $\tau=2$ as used by other authors
Additional for CIFAR10: batch normalization to speed up training Memory Computation MNIST. The model is five-layer fully connected MLP:

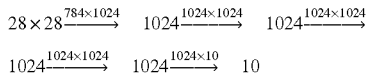

The total number of parameters is 3,958,784. However, EWC requires another set to store the diagonal of the Fisher, so in total there are 7,917,568 float32 numbers. Each MNIST image is of size 28×28+10=794 where the 10 is for its output logits/probs. Therefore, for 5 tasks, each can have 7917568/794/5≈1994 images. To make things easier, Applicants store 1900 images per task. Note that the original MNIST format is based on uint8 instead of float32 for the images, which means Applicants can in fact store much more images if the memory is also based on uint8 for the images.

CIFAR10. The model is VGG-like "ccpccpccpff", where 'c' means convolution, 'p' means 2×2 max-pooling and 'f' means fully connected:

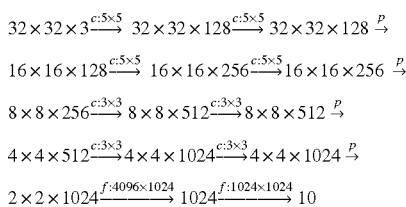

The parameters involved are

| ccp: | 5 × 5 × 3 × 128 | 5 × 5 × 128 × 128 |
|---|---|---|
| ccp: | 5 × 5 × 128 × 256 | 5 × 5 × 256 × 256 |
| ccp: | 3 × 3 × 256 × 512 | 3 × 3 × 512 × 512 |
| ccp: | 3 × 3 × 512 × 1024 | 3 × 3 × 1024 × 1024 |
| ff: | 4096 × 1024 | 1024 × 10 |

In total, there are 24,776,064 float32 parameters. However, taking into account that Applicants need another set to store the diagonal of the Fisher, the total memory for EWC is 49,552,128. Each CIFAR10 image is of size 32×32×3+10=3082 where the 10 is for its output logits/probs. Therefore, for 5 tasks, each can have 49552128/3082/5≈3216 images. To make things easier, Applicants store 3000 images per task.

Figure 15:
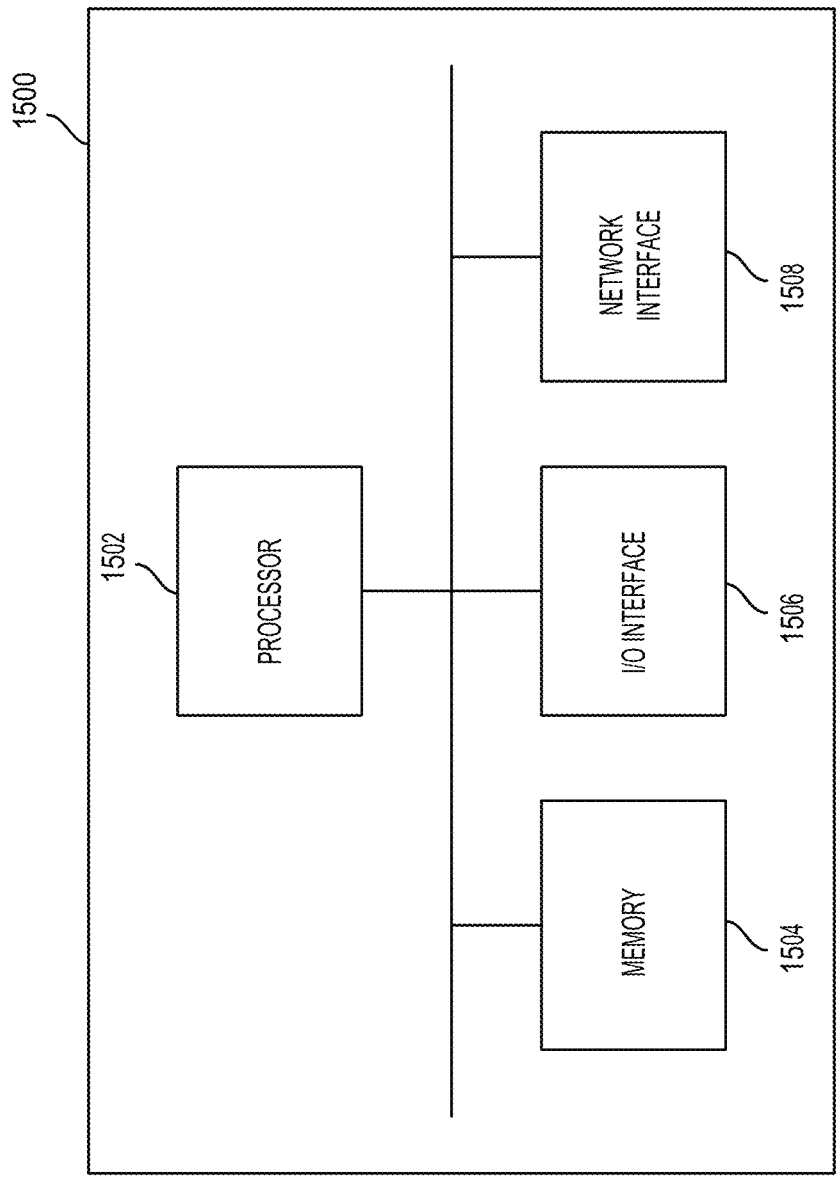
FIG. 15 is a computing system, according to some embodiments.

FIG. 15 is a schematic diagram of a computing device 1500 such as a server. As depicted, the computing device includes at least one processor 1502, memory 15015, at least one I/O interface 1506, and at least one network interface 1508. The computing device 1500 may, for example, be provided as the neural networking engine 102.

Processor 1502 may be an Intel or AMD x86 or x64, PowerPC, ARM processor, or the like. Memory 1504 may include a combination of computer memory that is located either internally or externally such as, for example, random-access memory (RAM), read-only memory (ROM), compact disc read-only memory (CDROM).

Each I/O interface 1506 enables computing device 1500 to interconnect with one or more input devices, such as a keyboard, mouse, camera, touch screen and a microphone, or with one or more output devices such as a display screen and a speaker. In some embodiments, the interface 1506 are application programming interfaces configured to receive data sets, etc. representative of new data for processing by neural networking engine 102.

Each network interface 1508 enables computing device 1500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Figure 16:
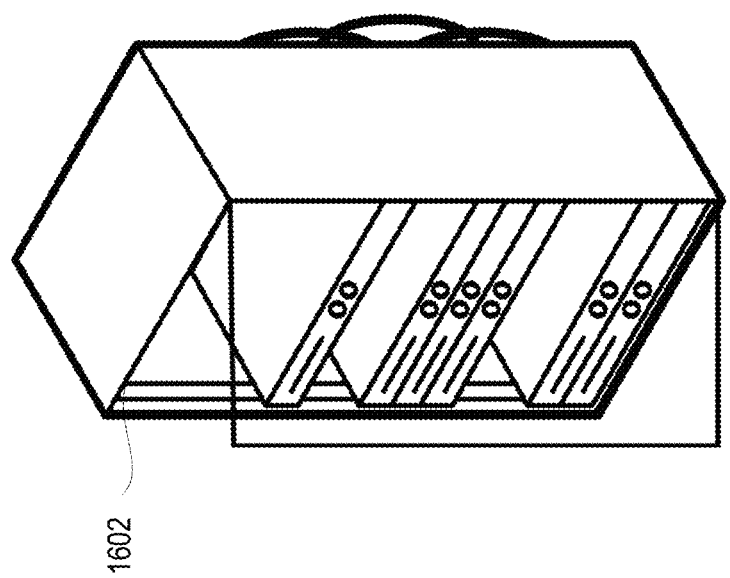
FIG. 16 is a special purpose computing machine, according to some embodiments.

FIG. 16 is an illustration of a special purpose machine 1602, according to some embodiments that may reside at data center. The special purpose machine 1602, for example, incorporates the features of the system 100 and is provided in a portable computing mechanism that, for example, may be placed into a data center as a rack server or rack server component that interoperates and interconnects with other devices, for example, across a network or a message bus.

The special purpose machine 1602, in some embodiments, is an improved neural networking engine configured to maintain an updated neural network that is less prone to catastrophic forgetting while utilizing a reduced memory footprint relative to other approaches to the technical problem.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented method for training performance of a deep neural network adapted to attain a model $f_T:X \mapsto \Delta^C$ that maps data in an input space X to a C-dimensional probability simplex that reduces catastrophic forgetting on a first T data sets after training on T sequential tasks, $D_T$ representing a current available data set, and $D_t$, $t \leq T$ representing additional data sets and the current available data set, the computer implemented method comprising:
   storing, in non-transitory computer readable memory, logits of a set of samples from a previous set of tasks, $D_1$, the storage establishing a memory cost $m \ll n_1$;
   maintaining classification information from the previous set of tasks by utilizing the logits for matching during training on a new set of tasks, $D_2$, the logits selected to reduce a dependency on representation of $D_1$; and
   training the deep neural network on $D_2$, and applying a penalty on the deep neural network for prediction deviation, the penalty adapted to sample a memory $x_i^{(1)}$, i=1, ..., m from $D_1$ and matching outputs for $f_1^*$ when training $f_2$; wherein m is a memory size of the memory $x_i^{(1)}$, $n_1$ is a number of tasks in $D_1$, and $f_1^*$ is a model f trained on the first T data sets.

2. The method of claim 1, wherein the penalty on the deep neural network for the prediction deviation is established according to a relation:

$$\min_\theta \frac{1}{n_2} \sum_i L(y_i^{(2)}, f_\theta(x_i^{(2)})) + \frac{1}{m} \sum_j L(x_j^{(1)}(f_1^*(x_j^{(1)})), f_\theta(x_j^{(1)}))$$

where $(x_j^{(1)}, y_j^{(1)})$ is a data pair of $D_1$, $(x_j^{(2)}, y_j^{(2)})$ is a data pair of $D_2$, L is a Kullback-Leibler (KL) divergence, and f is parametrized by a vector $\Theta\theta \in \mathbb{R}^p$; wherein i and j are index notations.

3. The method of claim 2, wherein $L_2$ regularization is applied to the logits, in accordance with a relation:

$$\min_\theta \frac{1}{n_2} \sum_i L(y_i^{(2)}, f_\theta(x_i^{(2)})) + \frac{1}{m} \sum_j \|\hat{z}_j^{(1)} - \hat{z}_j^{(2)}\|_2^2,$$

where $\hat{z}_j^{(1)}, \hat{z}_j^{(2)}$ are the logits produced by $f_1^*$ and $f_\theta$ respectively.

4. The method of claim 3, comprising: applying a logits matching regularization R in accordance with a relation:

$$\mathcal{R}(\hat{\mathbb{P}}, \hat{\mathbb{Q}}) = \frac{1}{K} \sum_y (U_{\hat{\mathbb{P}}}(y) - U_{\hat{\mathbb{Q}}}(y))^2$$

where:
   (x,y) data pair,
   $\hat{y}$ predicted label
   $\hat{\mathbb{P}}$ the output probability vector with logits $Z_{\hat{\mathbb{P}}}$
   $\hat{\mathbb{Q}}$ the output probability vector with logits $Z_{\hat{\mathbb{Q}}}$
   $\tau$ temperature hyperparameter
   K number of class.

5. The method of claim 1, wherein the performance improvement is a reduction of a forgetting behavior.

6. The method of claim 5, wherein the reduction of the forgetting behavior includes while training on $D_2$, the deep neural network is still capable of predicting on $D_1$.

7. The method of claim 1, wherein the non-transitory computer readable memory has a limited memory size having a float number memory size/task ratio selected from at least one of 10, 50, 100, 500, 1000, 1900, or 1994.

8. The method of claim 1, wherein the deep neural network is configured for image recognition tasks, and wherein both the previous set of tasks and the new set of tasks are image classification tasks.

9. The method of claim 8, wherein the previous set of tasks includes processing a permuted image data set, and wherein the new set of tasks includes processing the permuted image data set where pixels of each underlying image are linearly transformed.

10. The method of claim 8, wherein the previous set of tasks includes processing a permuted image data set, and wherein the new set of tasks includes processing the permuted image data set where pixels of each underlying image are non-linearly transformed.

11. A computing device adapted for training performance of a deep neural network adapted to attain a model $f_T:X \mapsto \Delta^C$ that maps data in an input space X to a C-dimensional probability simplex that reduces catastrophic forgetting on a first T data sets after training on T sequential tasks, $D_T$ representing a current available data set, and $\mathcal{D}_t$, $t \leq T$ representing additional data sets and the current available data set, the computing device comprising a computer processor operating in conjunction with non-transitory computer memory, the computer processor configured to:
   store, in the non-transitory computer readable memory, logits of a set of samples from a previous set of tasks, $D_1$, the storage establishing a memory cost $m \ll n_1$;
   maintain classification information from the previous set of tasks by utilizing the logits for matching during training on a new set of tasks, $D_2$, the logits selected to reduce a dependency on representation of $D_1$; and
   train the deep neural network on $D_2$, and apply a penalty on the deep neural network for prediction deviation, the penalty adapted to sample a memory $x_i^{(1)}$, i=1, ..., m from $D_i$ and matching outputs for $f_1^*$ when training $f_2$; wherein m is a memory size of the memory $x_i^{(1)}$, $n_1$ is a number of tasks in $D_1$, and $f_1^*$ is a model f trained on the first T data sets.

12. The device of claim 11, wherein the penalty on the deep neural network for the prediction deviation is established according to a relation:

$$\min_\theta \frac{1}{n_2} \sum_i L(y_i^{(2)}, f_\theta(x_i^{(2)})) + \frac{1}{m} \sum_j L(f_1^*(x_j^{(1)}), f_\theta(x_j^{(1)})),$$

where $(x_j^{(1)}, y_j^{(1)})$ is a data pair of $D_1$, $(x_i^{(2)}; y_i^{(2)})$ is a data pair of $D_2$, L is the Kullback-Leibler (KL) divergence, and f is parametrized by a vector $\Theta\theta \in \mathbb{R}^P$; wherein i and j are index notations.

13. The device of claim 12, wherein $L_2$ regularization is applied to the logits, in accordance with a relation:

$$\min_\theta \frac{1}{n_2} \sum_i L(y_i^{(2)}, f_\theta(x_i^{(2)})) + \frac{1}{m} \sum_j \|\hat{z}_j^{(1)} - \hat{z}_j^{(2)}\|_2^2,$$

where $\hat{z}_j^{(1)}, \hat{z}_j^{(2)}$ are the logits produced by $f_1^*$ and $f_\theta$ respectively.

14. The device of claim 13, wherein the computer processor is further configured to: apply logits matching regularization R in accordance with a relation:

$$\mathcal{R}(\hat{\mathbb{P}}, \hat{\mathbb{Q}}) = \frac{1}{K} \sum_y (U_{\hat{\mathbb{P}}}(y) - U_{\hat{\mathbb{Q}}}(y))^2$$

where:
(x,y) data pair,
ŷ predicted label
$\hat{\mathbb{P}}$ the output probability vector with logits $Z_{\hat{\mathbb{P}}}$
$\hat{\mathbb{Q}}$ the output probability vector with logits $Z_{\hat{\mathbb{Q}}}$
τ temperature hyperparameter
K number of class.

15. The device of claim 11, wherein a performance improvement is a reduction of a forgetting behavior.

16. The device of claim 15, wherein the reduction of the forgetting behavior includes while training on $D_2$, the deep neural network is still capable of predicting on $D_1$.

17. The device of claim 11, wherein the non-transitory computer readable memory has a limited memory size having a float number memory size/task ratio selected from at least one of 10, 50, 100, 500, 1000, 1900, or 1994.

18. The device of claim 11, wherein the deep neural network is configured for image recognition tasks, and wherein both the previous set of tasks and the new set of tasks are image classification tasks.

19. The device of claim 18, wherein the previous set of tasks includes processing a permuted image data set, and wherein the new set of tasks includes processing the permuted image data set where pixels of each underlying image are non-linearly transformed.

20. A non-transitory computer readable memory storing machine interpretable instructions, which when executed by a processor, cause the processor to execute a method for training performance of a deep neural network adapted to attain a model $f_T: X \mapsto \Delta^C$ that maps data in an input space X to a C-dimensional probability simplex that reduces catastrophic forgetting on a first T data sets after training on T sequential tasks, $D_T$ representing a current available data set, and $\mathcal{D}_t$, $t \leq T$ representing additional data sets and the current available data set, the method comprising:

storing, in non-transitory computer readable memory, logits of a set of samples from a previous set of tasks, $D_1$, the storage establishing a memory cost $m \ll n_1$;

maintaining classification information from the previous set of tasks by utilizing the logits for matching during training on a new set of tasks, $D_2$, the logits selected to reduce a dependency on representation of $D_1$; and training the deep neural network on $D_2$, and applying a penalty on the deep neural network for prediction deviation, the penalty adapted to sample a memory $x_i^{(1)}$, $i=1, \ldots, m$ from $D_1$ and matching outputs for $f_1^*$ when training $f_2$; wherein m is a memory size of the memory $x_i^{(1)}$, $n_1$ is a number of tasks in $D_1$, and $f_1^*$ is a model f trained on the first T data sets.

* * * * *

UNITED STATES PATENT AND TRADEMARK OFFICE
CERTIFICATE OF CORRECTION

PATENT NO. : 11,755,916 B2
APPLICATION NO. : 16/562067
DATED : September 12, 2023
INVENTOR(S) : Yanshuai Cao et al.

Page 1 of 1

It is certified that error appears in the above-identified patent and that said Letters Patent is hereby corrected as shown below:

In the Claims

Column 18 Line 15 (Claim 4):
"K number of class"
Should read:
-- K number of classes --

Column 19 Line 30 (Claim 14):
"K number of class"
Should read:
-- K number of classes --

Signed and Sealed this
Twenty-fourth Day of September, 2024

Katherine Kelly Vidal
*Director of the United States Patent and Trademark Office*